(12) United States Patent
Arnicar

(10) Patent No.: US 10,332,292 B1
(45) Date of Patent: Jun. 25, 2019

(54) VISION AUGMENTATION FOR SUPPLEMENTING A PERSON'S VIEW

(71) Applicant: Zoox, Inc., Menlo Park, CA (US)

(72) Inventor: Taylor Andrew Arnicar, Sunnyvale, CA (US)

(73) Assignee: Zoox, Inc., Foster City, CA (US)

(*) Notice: Subject to any disclaimer, the term of this patent is extended or adjusted under 35 U.S.C. 154(b) by 66 days.

(21) Appl. No.: 15/407,788

(22) Filed: Jan. 17, 2017

(51) Int. Cl.
| | |
|---|---|
| G06Q 30/00 | (2012.01) |
| H04N 7/18 | (2006.01) |
| G09G 5/377 | (2006.01) |
| G06T 11/60 | (2006.01) |
| G06F 3/01 | (2006.01) |
| G06K 9/00 | (2006.01) |
| B60W 30/09 | (2012.01) |
| B60W 50/14 | (2012.01) |

(52) U.S. Cl.
CPC ............. *G06T 11/60* (2013.01); *B60W 30/09* (2013.01); *B60W 50/14* (2013.01); *G06F 3/012* (2013.01); *G06K 9/00805* (2013.01); *B60W 2050/146* (2013.01)

(58) Field of Classification Search
None
See application file for complete search history.

(56) References Cited

U.S. PATENT DOCUMENTS

| | | | | |
|---|---|---|---|---|
| 6,999,602 | B2* | 2/2006 | Yoshida | B60R 1/00 382/103 |
| 7,860,301 | B2* | 12/2010 | Se | G01C 11/06 348/43 |
| 9,526,443 | B1* | 12/2016 | Berme | A61B 5/1123 |
| 9,626,802 | B2* | 4/2017 | Poulos | G06F 3/012 |
| 9,759,917 | B2* | 9/2017 | Osterhout | G02B 27/0093 |
| 9,792,710 | B2* | 10/2017 | Kimura | G06T 11/60 |
| 9,821,920 | B2* | 11/2017 | Cole | B64D 43/00 |
| 9,904,287 | B1* | 2/2018 | Kuffner, Jr. | G05D 1/0061 |
| 2007/0115352 | A1* | 5/2007 | Oskiper | H04N 5/232 348/44 |
| 2007/0219720 | A1* | 9/2007 | Trepagnier | B60W 30/00 701/300 |
| 2008/0012940 | A1* | 1/2008 | Kanaoka | H04N 5/272 348/148 |
| 2009/0128630 | A1* | 5/2009 | Kanaoka | H04N 5/23238 348/148 |

(Continued)

*Primary Examiner* — Martin Mushambo
(74) *Attorney, Agent, or Firm* — Lee & Hayes, P.C.

(57) ABSTRACT

An augmentation system may supplement a person's view from at least one of an actual vehicle or a virtual vehicle of an environment through which the vehicle travels. The system may include a receiver configured to receive data signals representative of operation of the vehicle and representative of objects in the environment through which the vehicle travels. The system may also include a converter in communication with the receiver. The converter may be configured to convert the data signals into display data representative of the operation of the vehicle and representative of the objects in the environment through which the vehicle travels. The converter may also be configured to communicate the display data to a display in communication with the converter and configured to display, within the person's view from the vehicle, images representative of the display data to supplement the person's view.

33 Claims, 12 Drawing Sheets

(56) References Cited

U.S. PATENT DOCUMENTS

| | | | | |
|---|---|---|---|---|
| 2009/0141031 A1* | 6/2009 | Meisingset | G06T 13/80 | 345/473 |
| 2010/0134325 A1* | 6/2010 | Gomi | B60R 1/00 | 340/995.14 |
| 2010/0231717 A1* | 9/2010 | Sasaki | G06T 5/006 | 348/148 |
| 2011/0106595 A1* | 5/2011 | Vande Velde | G06Q 30/02 | 705/14.4 |
| 2011/0128138 A1* | 6/2011 | Yamamoto | B60W 30/0956 | 340/436 |
| 2012/0026333 A1* | 2/2012 | Okuyama | B60R 1/00 | 348/148 |
| 2013/0083061 A1* | 4/2013 | Mishra | H04N 5/265 | 345/633 |
| 2013/0093851 A1* | 4/2013 | Yamamoto | G01S 15/931 | 348/46 |
| 2013/0128012 A1* | 5/2013 | Turner | G06F 3/011 | 348/53 |
| 2013/0181823 A1* | 7/2013 | Stahlin | B60K 35/00 | 340/436 |
| 2013/0278631 A1* | 10/2013 | Border | G02B 27/017 | 345/633 |
| 2014/0192247 A1* | 7/2014 | Cheong | G06F 3/011 | 348/333.11 |
| 2014/0210710 A1* | 7/2014 | Shin | G06T 11/60 | 345/156 |
| 2014/0232851 A1* | 8/2014 | Hough | H04N 7/181 | 348/118 |
| 2014/0266656 A1* | 9/2014 | Ng-Thow-Hing | G08G 1/166 | 340/435 |
| 2014/0285523 A1* | 9/2014 | Gruenler | G06T 19/006 | 345/633 |
| 2014/0333729 A1* | 11/2014 | Pflug | G06T 15/20 | 348/47 |
| 2014/0375816 A1* | 12/2014 | Maihoefer | G01C 21/365 | 348/148 |
| 2015/0097864 A1* | 4/2015 | Alaniz | G06T 19/006 | 345/633 |
| 2015/0100179 A1* | 4/2015 | Alaniz | A63F 13/00 | 701/1 |
| 2015/0145995 A1* | 5/2015 | Shahraray | H04W 4/70 | 348/148 |
| 2015/0149088 A1* | 5/2015 | Attard | G01C 21/36 | 701/538 |
| 2015/0178990 A1* | 6/2015 | Ng-Thow-Hing | G06T 19/006 | 715/850 |
| 2015/0206343 A1* | 7/2015 | Mattila | G06T 17/05 | 345/420 |
| 2015/0220991 A1* | 8/2015 | Butts | G06Q 30/0265 | 705/14.62 |
| 2015/0294505 A1* | 10/2015 | Atsmon | G06T 19/006 | 345/633 |
| 2015/0339589 A1* | 11/2015 | Fisher | G06N 99/005 | 706/12 |
| 2015/0348112 A1* | 12/2015 | Ramanujam | G06Q 30/0266 | 705/14.63 |
| 2016/0004076 A1* | 1/2016 | Matsubara | G02B 27/0101 | 345/7 |
| 2016/0041386 A1* | 2/2016 | Rodriguez Moreno | G02B 27/0101 | 345/7 |
| 2016/0176345 A1* | 6/2016 | Lee | G06K 9/00805 | 348/148 |
| 2016/0187653 A1* | 6/2016 | Kimura | G06T 11/60 | 345/8 |
| 2016/0210382 A1* | 7/2016 | Alaniz | G05D 1/0221 | |
| 2016/0261300 A1* | 9/2016 | Fei | H04W 4/70 | |
| 2016/0284125 A1* | 9/2016 | Bostick | G06T 19/006 | |
| 2016/0325676 A1* | 11/2016 | Yamada | B60Q 9/008 | |
| 2016/0332568 A1* | 11/2016 | Kim | B60Q 1/50 | |
| 2017/0146799 A1* | 5/2017 | Oh | B60R 1/00 | |
| 2017/0192423 A1* | 7/2017 | Rust | G05D 1/0038 | |
| 2017/0200308 A1* | 7/2017 | Nguyen | G06T 3/0012 | |
| 2017/0344114 A1* | 11/2017 | Osterhout | G06F 3/012 | |
| 2017/0344223 A1* | 11/2017 | Holzer | G06K 9/00664 | |
| 2018/0048801 A1* | 2/2018 | Kiser | H04N 9/045 | |
| 2018/0074493 A1* | 3/2018 | Prokhorov | G06N 3/0454 | |
| 2018/0232956 A1* | 8/2018 | Jan Wyszka | G06T 19/006 | |
| 2018/0261095 A1* | 9/2018 | Qiu | G06K 9/00791 | |

* cited by examiner

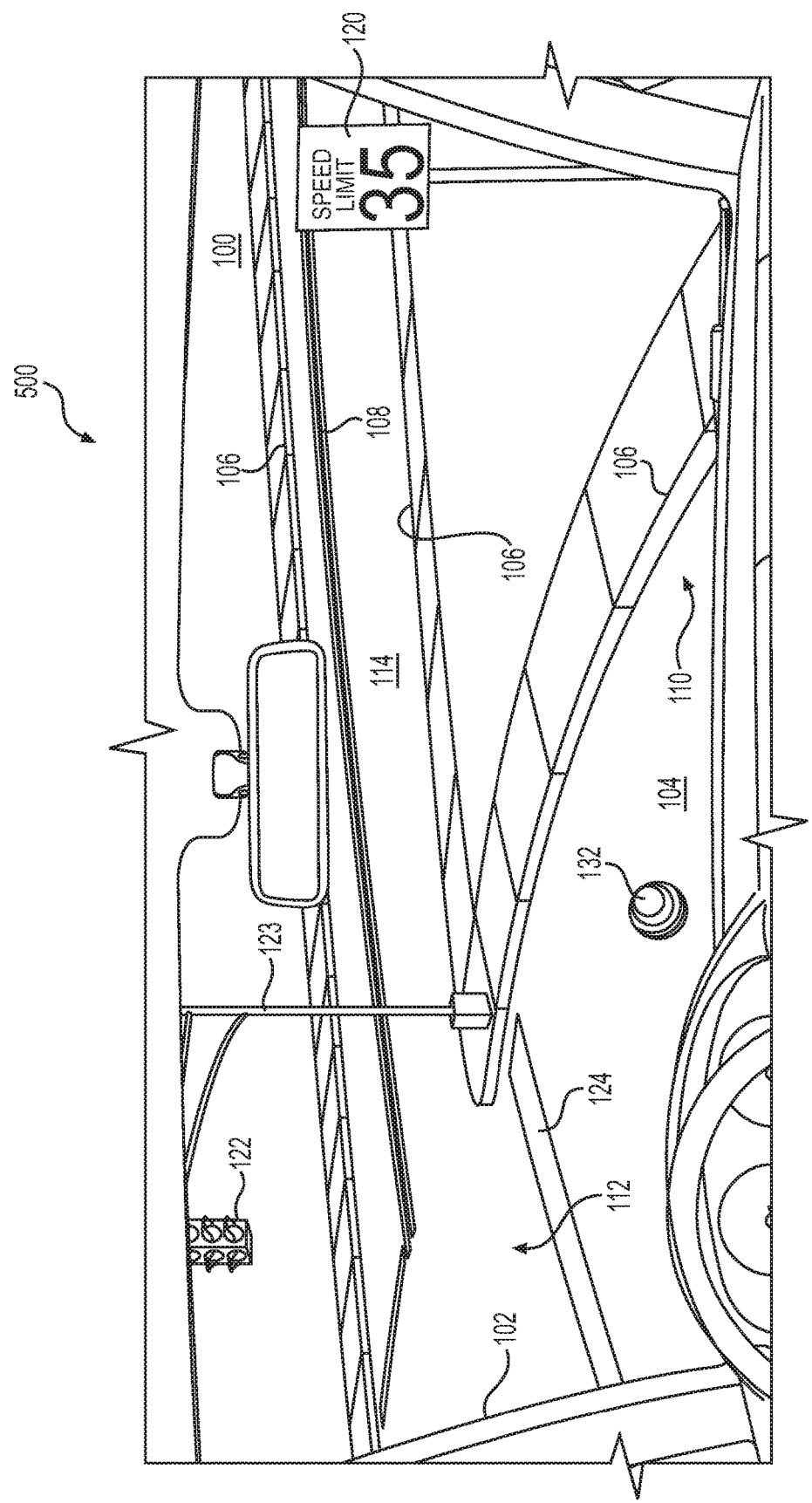

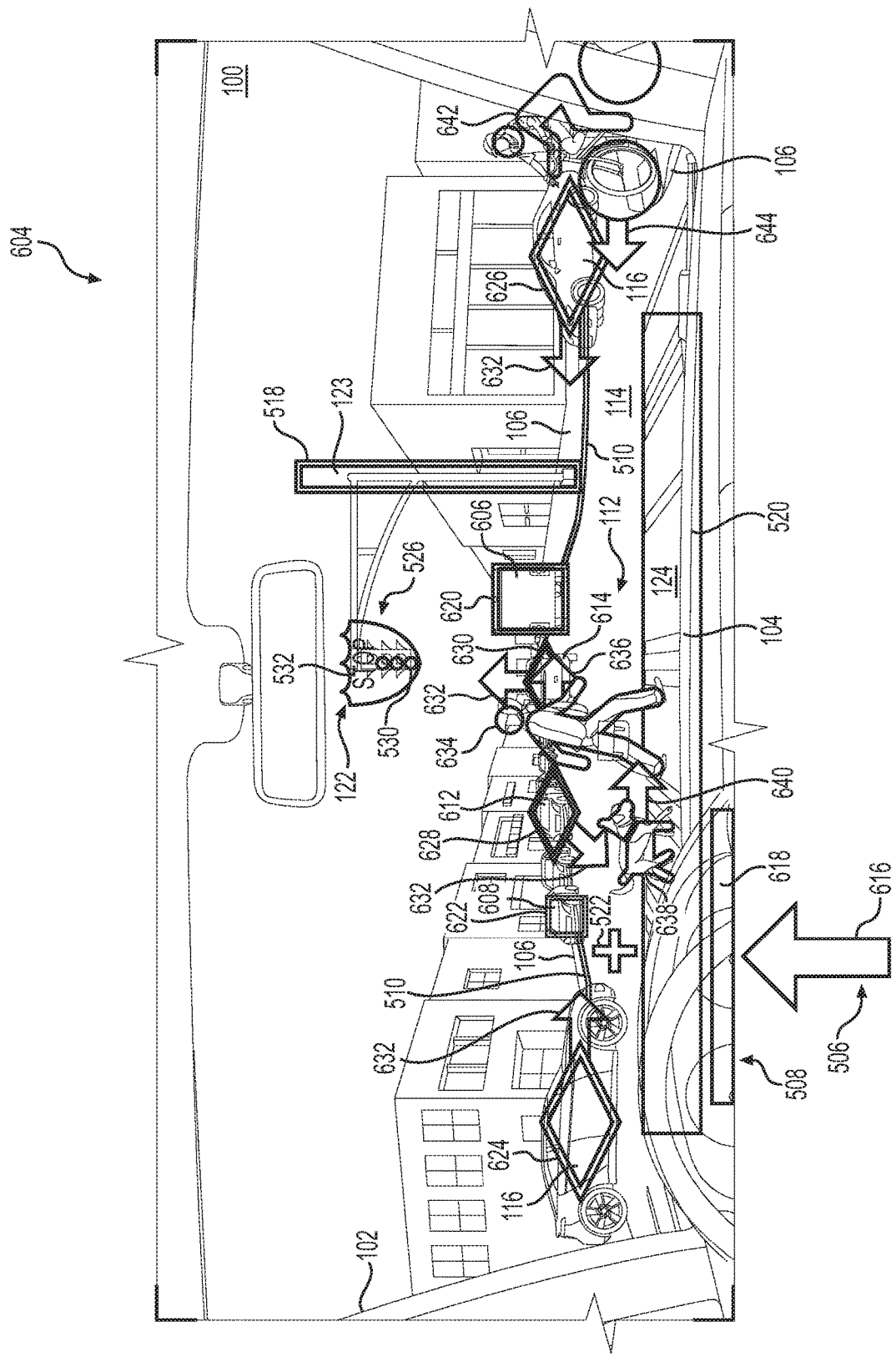

US 10,332,292 B1

VISION AUGMENTATION FOR SUPPLEMENTING A PERSON'S VIEW

BACKGROUND

When operating a machine, it may be beneficial during operation of the machine to see information representative of data received from machine sensors during operation of the machine. However, if the information is presented in a form that distracts the operator of the machine, thereby interfering with the operator's ability to operate the machine, such information may not be useful because the operator may not be able to both operate the machine and view the information.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 5A is a schematic perspective view of an example view from an example vehicle of an example environment through which the vehicle travels;

FIG. 6C is an example supplemented view of the example view shown in FIG. 6A;

DETAILED DESCRIPTION

Figure 1:
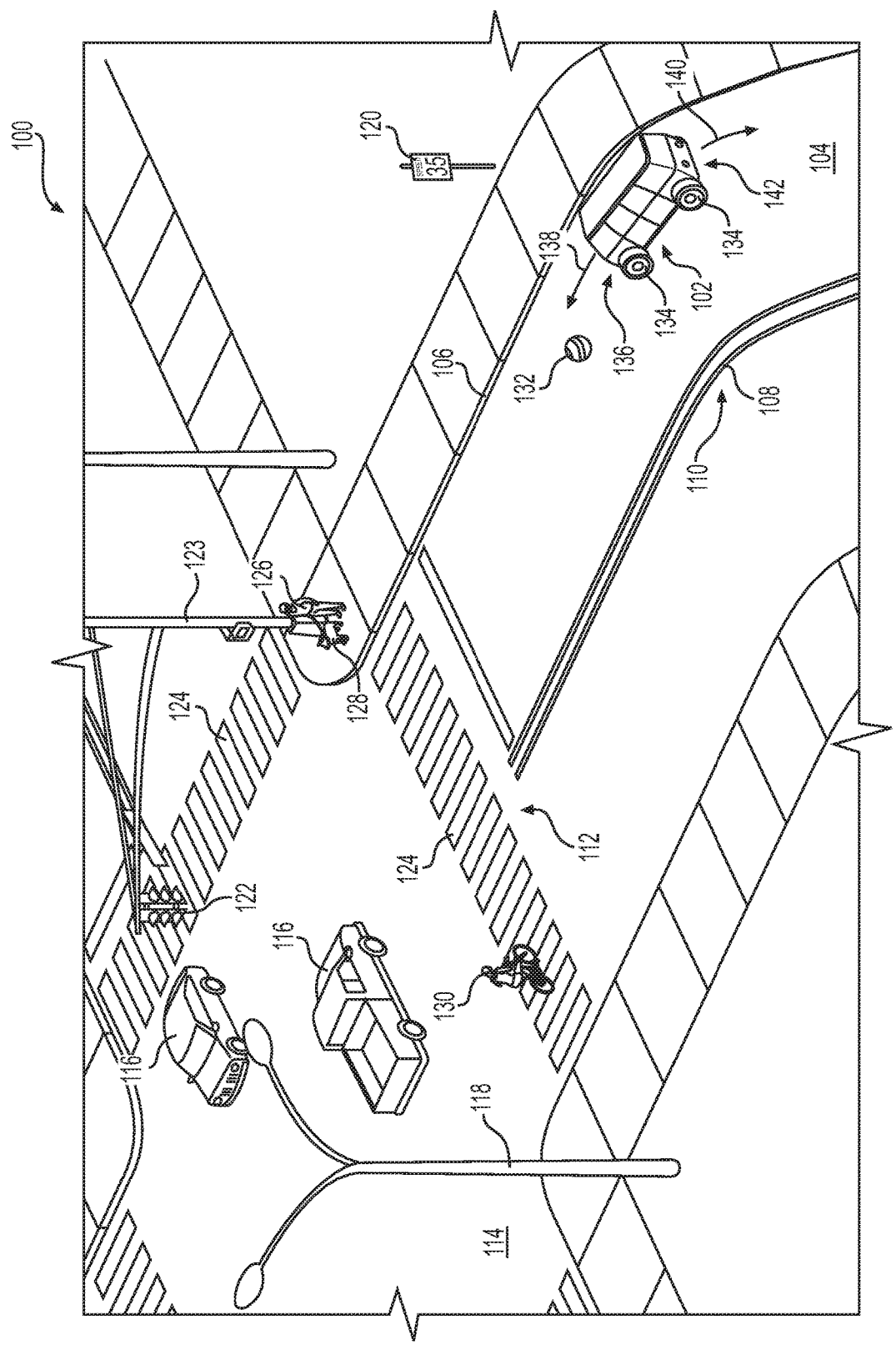
FIG. 1 is a schematic perspective view of an example vehicle traveling through an example environment.

When monitoring the operation of a machine, it may be beneficial to view information representative of signals received from sensors associated with operation of the machine. However, there may be situations in which it is difficult to both monitor the operation of the machine and view the information representative of the sensor signals.

For example, when testing a vehicle, a vehicle tester may monitor operation of the vehicle as the vehicle maneuvers though an environment, such as along a street or highway, or in a parking lot. Operation of the vehicle may generate data derived from sensors associated with different systems of the vehicle. Some of the data may be relatively complex or may change rapidly, thus rendering it difficult for the vehicle tester to both sufficiently monitor the vehicle's movements through the environment and monitor the data derived from the sensors.

When operating a partially or fully autonomous vehicle, for example, the occupant (e.g., a tester of the vehicle) may be present to ensure safe maneuvering of the vehicle by being ready to take control of the vehicle, for example, when it appears the vehicle may be approaching a potentially hazardous situation, such as a collision with an object. For a partially or fully autonomous vehicle, however, the vehicle may be able to avoid collisions without interference from the occupant, but the occupant may not be able to determine whether the vehicle, without the occupant's assistance, will avoid the collision until after the occupant has taken control of the vehicle. This may result in erroneous conclusions about the ability of the vehicle to operate autonomously in a safe manner.

In an attempt to mitigate or overcome this situation, a second person (e.g., another tester) may be present in the vehicle. The second person may monitor data signals received from the vehicle's sensors (e.g., via a portable computer) and inform the occupant, who has access to controls for maneuvering the vehicle, about whether the vehicle's sensors have detected possible objects into which the vehicle might collide. The second person may also inform the occupant about whether the vehicle is projected to take action to avoid the collision. However, miscommunication and delays inherent with identifying such a situation and informing the occupant of the situation may render this procedure unsatisfactory in some situations. Although this example scenario has been described in relation avoiding collisions, similar issues may also, or alternatively, apply to determining other information related to operation of the vehicle, such as whether the vehicle has identified the limits of the road and its projected path, and/or whether the vehicle will adhere to vehicle operation laws and regulations, such as highway signals, traffic signals, speed limits, and/or right-of-way rules.

Some examples described herein may augment a person's view from a vehicle of an environment through which the vehicle travels. Such examples may provide the person with an ability to see both the environment and images representative of signals received from sensors and systems associated with the vehicle. For example, if the vehicle is a partially or fully autonomous vehicle, or if the vehicle includes sensors configured to sense data associated with objects outside the vehicle, the person's view may be augmented or supplemented with images representative of the sensed data. This may provide the person with the ability to both see the environment and determine whether the vehicle sensors have detected objects in the environment, and/or whether the vehicle projects maneuvering to stay on the road, avoid objects, and/or adhere to vehicle operation laws and regulations.

The disclosure is generally directed to systems and methods for supplementing a person's view from a vehicle of an environment through which the vehicle travels. In some examples, the systems and methods described herein may be used to assist with operation and/or testing of any vehicle, including ground-borne, airborne, and waterborne vehicles. In some examples, the systems and methods according to this disclosure may be incorporated into vehicles having little or no autonomous capability in order to improve the vehicle's ability to sense objects in the environment and maneuver safely to stay on the road, avoid collisions with objects in the environment, and/or adhere to vehicle operation laws and regulations. In some examples, the systems and methods may be incorporated into partially or fully autonomous vehicles that do not require driver control or attention. In such vehicles, the systems and methods according to this disclosure may be used for operation and/or testing of the vehicle, and may provide a person operating or testing the vehicle with an ability to see both the environment through which the vehicle travels and images representative of data received from the vehicle's sensors and systems. This may enhance or provide the person with an ability to determine whether the vehicle senses the limits of the road on which it travels, senses objects in the environment, senses vehicle operation laws and regulations, and/or whether the vehicle projects staying on the road, avoiding collisions, and/or adhering to the laws and regulations.

In some examples, an augmentation system may be provided for supplementing a person's view from an actual vehicle and/or a virtual vehicle of an environment through which the vehicle travels. The system may include a receiver configured to receive data signals representative of operation of the vehicle and representative of objects in the environment through which the vehicle travels. The system may also include a converter in communication with the receiver. The converter may be configured to convert the data signals into display data representative of the operation of the vehicle and representative of the objects in the environment through which the vehicle travels. The converter may also be configured to communicate the display data to a display in communication with the converter and configured to display, within the person's view from the vehicle, images representative of the display data to supplement the person's view.

In some examples, the person may be an occupant of an actual vehicle, a teleoperator located remotely from a vehicle and communicating with the vehicle via a communication link, or a person operating in a virtual vehicle environment provided by a simulator. In some examples, the vehicle may be an actual vehicle or a virtual vehicle provided by a simulator.

In some examples, the data signals representative of operation of the vehicle may include at least one of signals associated with trajectory of the vehicle or signals associated with a predicted trajectory of the vehicle. The data signals representative of the objects in the environment through which the vehicle travels may include data associated with at least one of location of the objects, types of the objects, historical paths of the objects, or predicted paths of the objects.

In some examples, the system may also include a display configured to display the images representative of the display data. In some examples, the display may include at least one of a video headset configured to be worn by the person, a heads-up display configured to be associated with the vehicle or video glasses, and/or any other suitable type of display. For example, the video headset may include a three-dimensional video headset, a two-dimensional video headset, augmented reality glasses, and/or video glasses, such as GOOGLE GLASS® or MICROSOFT HOLOLENS®. In some examples, the heads-up display may include a display projected onto the vehicle windshield or a transparent panel between the person and the windshield, a projected display of images projected onto one or more interior panels of the vehicle, and/or one or more light emitting diode (LED) or organic light emitting diode (OLED) panels associated with an interior of the vehicle.

In some examples, the system may also include a viewer position and/or orientation system configured to estimate a position of the person and/or a direction of view of the person. For example, a video headset may include sensors such as accelerometers and/or gyroscopes configured to estimate the position of the person's head and/or the rotational orientation (e.g., the left-to-right orientation) of the person's head and/or the elevational orientation (e.g., the up-and-down orientation) of the person's head. In some examples, a sensor not worn by the person, but inside the vehicle, may be used to determine the position and/or orientation. Other types of sensors are contemplated. Estimating the position of the person's head and/or the direction of view of the person may be used to tailor the displayed images representative of the display data to the direction of view of the person. For example, if the person's head is located at a particular position and/or the view is out the windshield and toward the right-hand side of the vehicle, the displayed images may be limited to those images that are relevant in that particular viewing position and/or direction.

In some examples, at least one of the images may include an image representative of a stationary object and may provide an indication that the stationary object is stationary. For example, the stationary object may be at least one of an edge of the road and/or a lane line of the road on which the vehicle is traveling, a sign, a traffic signal, or an object on the road, and the image may provide an indication of at least one of the location or the type of the object.

In some examples, at least one of the images may include an image representative of a moving object and provide an indication that the moving object is moving. For example, the moving object may be at least one of a vehicle, a pedestrian, a cyclist, or an animal, and the image may provide an indication of at least one of the location of the object, the type of the object, a historical path of the object, or a predicted path of the object.

In some examples, at least one of the images may include an image providing an indication of a predicted collision with at least one of the objects. For example, the indication of a predicted collision may include at least one of an addition of a textual overlay to the image, a change of color of the image, a change of shade of color of the image, a change in shape of the image, a change in size of the image, blinking of the image, or a change in rate of blinking of the image. In some examples, indication of a predicted collision may include other signals, such as, for example, vibration of a seat of the vehicle, sounding of an audio alarm, and activation of an air jet directed at the person. In some examples, the indication of a predicted collision may change based in part on a change in probability of the predicted collision occurring. For example, if the probability of the collision occurring reaches a threshold level, the image may change color and/or the rate of blinking.

In some examples, at least one of the images may provide an indication of a vehicle operation law or regulation. For example, the indication of a vehicle operation law or regulation may include an indication of at least one of a requirement to stop the vehicle, a maximum speed of the vehicle, or a requirement to yield right-of-way to at least one of a pedestrian, a cyclist, or another vehicle.

In some examples, the environment may be a simulated environment, and the person's view may be a virtual view. For example, the environment may a computer-generated environment provided by a simulator, and the person's view may be a computer-generated virtual view provided by the simulator.

A method for supplementing a person's view from at least one of an actual vehicle or a virtual vehicle of an environment through which the vehicle travels, may include receiving data signals representative of operation of the vehicle and representative of objects in the environment through which the vehicle travels. The method may include converting the data signals into display data representative of the operation of the vehicle and representative of the objects in the environment through which the vehicle travels. The method may also include displaying, within the person's view from the vehicle, images representative of the display data to supplement the person's view.

In some examples of the method, receiving data signals representative of operation of the vehicle may include receiving at least one of signals associated with trajectory of the vehicle or signals associated with a predicted trajectory of the vehicle. For example, displaying, within the person's view from the vehicle, images representative of the display data may include displaying data associated with at least one of the location of the objects, the types of the objects, the historical paths of objects, or the predicted paths of the objects. In some examples, displaying, within the person's view from the vehicle, images representative of the display data may include displaying the images via at least one of a video headset configured to be worn by the person, a heads-up display configured to be associated with the vehicle, or video glasses. In some examples, the method may also include estimating a position and/or a direction of view of the person.

In some examples of the method, at least one of the images may include an image representative of a stationary object, and the method may include displaying an indication that the stationary object is stationary. For example, the stationary object may be at least one of an edge of the road on which the vehicle travels, a sign, a traffic signal, or an object on the road, and the method may include displaying at least one of the location or the type of the stationary object.

In some examples of the method, at least one of the images may include an image representative of a moving object, and the method may include displaying an indication that the moving object is moving. For example, the moving object may be at least one of a vehicle, a pedestrian, a cyclist, or an animal, and the method may include displaying at least one of the location of the moving object, the type of the moving object, or a predicted path of the moving object.

In some examples of the method, displaying the images may include displaying an image providing an indication of a predicted collision with at least one of the objects. For example, displaying the indication of the predicted collision may include at least one of adding a textual overlay to the image, changing a color of the image, changing a shade of color of the image, changing a shape of the image, changing a size of the image, causing the image to blink, or causing a change in the rate of blinking of the image. For example, displaying the image providing the indication of the predicted collision may include changing the image based in part on a change in probability of the predicted collision occurring.

In some examples of the method, displaying the images may include displaying an indication of a vehicle operation law or regulation. For example, displaying the indication of the vehicle operation law or regulation may include displaying an indication of at least one of a requirement to stop the vehicle, a maximum speed of the vehicle, or a requirement to yield right-of-way to at least one of a pedestrian, a cyclist, or another vehicle.

A method for testing an autonomous vehicle may include supplementing the person's view from the vehicle of the environment through which the vehicle travels for example, according to any of the methods described herein. The method may also include comparing actual objects viewable by the person from the vehicle with the images representative of the display data, and identifying differences between the actual objects and the images based on the comparison. In some examples, the method may also include collecting data associated with the differences. In some examples, the method may also include analyzing the differences and modifying operation of at least one of the sensors associated with the vehicle or control systems associated with the vehicle. In some examples of the testing method, the method may also include controlling the vehicle manually based on the differences. In some examples, the method may be performed as a virtual simulation of testing an autonomous or semiautonomous vehicle. For example, the person may not be located in an actual vehicle, but may instead be occupying a virtual vehicle that provides a virtual simulation of being inside a vehicle and testing the virtual vehicle.

The techniques and systems described herein may be implemented in a number of ways. Example implementations are provided below with reference to the figures.

FIG. 1 is a schematic diagram of an example environment 100 through which an example vehicle 102 travels. The example environment 100 includes a road 104 having an edge 106 and a center line 108 providing a guide for the path of the vehicle 102. In the example environment 100 shown, the road 104 includes a curve 110 and crosses an intersection 112 with a crossroad 114 on which other vehicles 116 travel. The example environment 100 also includes a plurality of objects. For example, the environment 100 includes a light post 118 and a traffic sign 120 that provides notification of a local vehicle operation law or regulation, such as a speed limit, or other information relating to the immediate vicinity of the road 104. The example environment 100 also includes a traffic signal 122 mounted on a post 123 for managing traffic flow through the intersection 112. In the example shown, the traffic signal 122 includes a traffic light providing an indication of whether the vehicle 102 is permitted to proceed through the intersection 112, whether the vehicle 102 must stop and wait for a signal before proceeding through the intersection 112, and a warning that the traffic signal 122 is about to change to an indication that the vehicle 102 must stop at the intersection 112. In addition, the example environment 100 also includes a crosswalk 124 providing pedestrians and cyclists with a guide for crossing the road 104 and at the crossroad 114. Also present in the example environment 100 shown in FIG. 1 is a pedestrian 126 with a dog 128 at an edge 106 of the road 104 and approaching the crosswalk 124 for crossing the road 104. In addition, the environment 100 includes a cyclist 130 crossing the road 104 on the crosswalk 124, and a ball 132 in the road 104 between the vehicle 102 and the intersection 112.

For the purpose of illustration, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In that case, since the vehicle 102 may be configured to control all functions from start to stop, including all parking functions, it may be unoccupied. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 shown in FIG. 1 is an automobile having four wheels 134 and respective tires for each of the wheels 134. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, any combination thereof, and/or any other suitable power sources. In addition, although the example vehicle 102 has four wheels 134, the systems and methods described herein may be incorporated into vehicles having fewer or a greater number of wheels, tires, and/or tracks. The example vehicle 102 has four-wheel steering and may operate generally with equal performance characteristics in all directions, for example, such that a first end 136 of the vehicle 102 is the front end of the vehicle 102 when travelling in a first direction 138, and such that the first end 136 becomes the rear end of the vehicle 102 when traveling in the opposite, second direction 140, as shown in FIG. 1. Similarly, a second end 142 of the vehicle 102 is the front end of the vehicle 102 when travelling in the second direction 140, and such that the second end 142 becomes the rear end of the vehicle 102 when traveling in the opposite, first direction 138. These example characteristics may facilitate greater maneuverability, for example, in small spaces or crowded environments, such as parking lots and urban areas.

Figure 2:
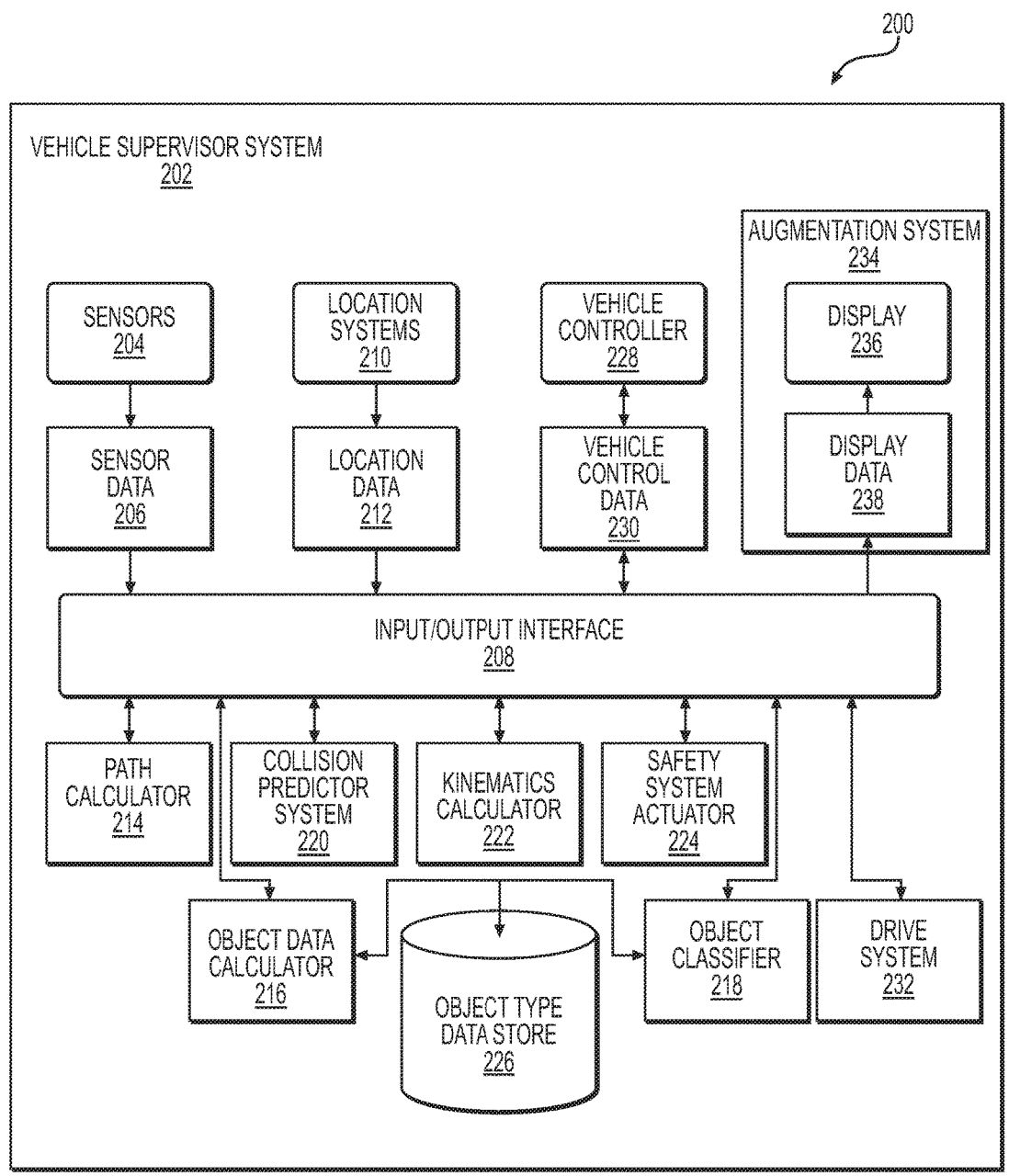
FIG. 2 is a block diagram of an example control architecture for an example vehicle.

FIG. 2 is a block diagram of an example architecture 200 including a vehicle supervisor system 202 for controlling operation of the systems that provide data associated with operation of the vehicle 102, and that control operation of the vehicle 102.

In various implementations, the architecture 200 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA. In some examples, the processor(s) may include a central processing unit (CPU), a graphics processing unit (GPU), or a combination thereof.

The example architecture 200 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the architecture 200 via an I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In one implementation, the I/O interface may be configured to coordinate I/O traffic between the processor(s), the non-transitory computer readable media, and any peripheral devices, the network interface, or other peripheral interfaces, such as input/output devices. In some implementations, the I/O interface may perform any necessary protocol, timing, or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example architecture 200 shown in FIG. 2, the example vehicle supervisor system 202 includes a plurality of sensors 204, for example, configured to sense movement of the vehicle 102 through the environment 100, sense environmental data, such as the ambient temperature, pressure, and humidity, and/or sense objects in the environment 100 surrounding the vehicle 102. In some examples, the sensors 204 may include sensors configured to identify a location on a map. The sensors 204 may include, for example, a light detection and ranging sensor (LIDAR), one or more cameras, a radio detection and ranging sensor (RADAR), sound navigation and ranging (SONAR) sensors, microphones for sensing sounds in the environment 100, such as sirens from law enforcement and emergency vehicles, and other sensors related to the operation of the vehicle 102, such as a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The sensors 204 may also include, for example, inertial measurement units (IMUs), accelerometers, and gyroscopes. The sensors 204 may be configured to provide sensor data 206 representative of the sensed objects and signals to the vehicle supervisor system 202 via, for example, an input/output (I/O) interface 208. Other types of sensors and sensor data are contemplated.

The example vehicle supervisor system 202 also includes location systems 210 configured to receive location information, including position and orientation data (e.g., a local position or local pose) from the sensors 204 and/or external sources, and provide location data 212 to other portions of the vehicle supervisor system 202 via the I/O interface 208. The external sources may include satellites for facilitating operation of a global positioning system (GPS) and/or a wireless network for communicating and receiving information related to the vehicle's location, such as map data. The location systems 210 may also include sensors configured to assist with navigation of the vehicle 102, such as wheel encoders for sensing the rotation of the wheels 134, inertial navigation sensors, such as gyroscopes and/or accelerometers, and/or cameras for obtaining image data for dead-reckoning navigation.

The example vehicle supervisor system 202 also includes one or more of a path calculator 214, an object data calculator 216, an object classifier 218, a collision predictor system 220, a kinematics calculator 222, and a safety system actuator 224. The vehicle supervisor system 202 is configured to access one or more data stores including, but not limited to, an object type data store 226. The object type data store 226 may include data representing object types associated with object classifications for objects detected in the environment 100.

The example vehicle supervisor system 202 shown in FIG. 2 also includes a vehicle controller 228 configured to receive vehicle control data 230, and based on the vehicle control data 230, communicate with a drive system 232 (e.g., a steering system, a propulsion system, and/or a braking system) to control operation of the vehicle 102. For example, the vehicle control data 230 may be derived from data received from one of more of the sensors 204 and one or more of the path calculator 214, the object data calculator 216, the object classifier 218, the collision predictor system 220, the kinematics calculator 222, and the safety system actuator 224, and control operation of the drive system 230, so that operation and maneuvering of the vehicle 102 is executed.

In some examples, the path calculator 214 may be configured to generate data representative of a trajectory of the vehicle 102, for example, using data representing a location of the vehicle 102 in the environment 100 and other data, such as local pose data, that may be included in the location data 212. In some examples, the path calculator 214 may also be configured to determine projected trajectories predicted to be executed by the vehicle 102. The path calculator 214 may, in some examples, be configured to calculate data associated with a predicted motion of an object in the environment 100, and may determine a predicted object path associated with the predicted motion of the object. In some examples, the object path may include the predicted object path. In some examples, the object path may include a predicted object trajectory. In some examples, the path calculator 214 may be configured to predict more than a single predicted object trajectory. For example, the path calculator 214 may be configured to predict multiple object trajectories based on, for example, probabilistic determinations or multi-modal distributions of predicted positions, trajectories, and/or velocities associated with an object.

In some examples, the object data calculator 216 may be configured to provide data representative of, for example, one or more of the location of an object in the environment 100 surrounding the vehicle 102, an object track associated with the object, and an object classification associated with the object. For example, the object data calculator 216 may be configured to receive data in the form of sensor signals received from one or more of the sensors 204 and determine data representing one or more of the location in the environment 100 of the object, the object track, and the object classification.

In some examples, the object classifier 218 may be configured to access data from the object type data store 226, which may be configured to store data representing object types, such as, for example, a species of an object classification, a subclass of an object classification, and/or a subset of an object classification. The object classifier 218, in some examples, may be configured to analyze data representing an object track and data representing an object classification with data representing an object type, and determine an object type based at least in part on the object track and classification data. For example, a detected object having an object classification of an "automobile" may have an object type of "sedan," "coupe," "hatch-back," "sports utility vehicle," "pick-up truck," or "minivan." An object type may include additional subclasses or subsets. For example, a "sedan" that is parked may have an additional subclass designation of being "static" or "being dynamic" if moving.

In some examples, the collision predictor system 220 may be configured to use the data representing the object type, the data representing the trajectory of the object, and/or the data representing the trajectory of the vehicle 102, to predict a collision between the vehicle 102 and the object.

In some examples, the kinematics calculator 222 may be configured to determine data representing one or more scalar and/or vector quantities associated with motion of objects in the environment 100, including, but not limited to, velocity, speed, acceleration, deceleration, momentum, local pose, and/or force. Data from the kinematics calculator 222 may be used to compute other data, including, but not limited to, data representing an estimated time to impact between an object and the vehicle 102, and data representing a distance between the object and the vehicle 102. In some examples, the kinematics calculator 222 may be configured to predict a likelihood that other objects in the environment 100 (e.g., cars, motorcyclists, pedestrians, cyclists, and animals) are moving in an alert or controlled state, versus an un-alert or uncontrolled state. For example, the kinematics calculator 222 may be configured estimate the probability that other objects are moving as though they are being controlled and/or are behaving in a predictable manner, or whether they are not being controlled and/or behaving in an unpredictable manner, for example, by observing motion of the object over time and relative to other objects in the environment 100. For example, if the objects are moving erratically or without appearing to adjust to the presence or motion of other objects in the environment 100, this may be an indication that the objects are either uncontrolled or moving in an unpredictable manner. This may be inferred based on sensor data received over time that may be used to estimate or predict a future location of the object relative to a current or future trajectory of the vehicle 102.

In some examples, the safety system actuator 224 may be configured to activate one or more safety systems of the autonomous vehicle 102 when a collision is predicted by the collision predictor 220 and/or the occurrence of other safety related events, such as, for example, an emergency maneuver by the vehicle 102, such as hard braking or a sharp acceleration. The safety system actuator 224 may be configured to activate an interior safety system (e.g., including seat belt pre-tensioners and/or air bags), an exterior safety system (e.g., including warning sounds and/or warning lights), the drive system 232 configured to execute an emergency maneuver to avoid a collision, and/or any combination thereof. For example, the drive system 232 may receive data for causing a steering system of the vehicle 102 to change the travel direction of the vehicle 102, and a propulsion system of the vehicle 102 to change the speed of the vehicle 102 to alter the trajectory of vehicle 102 from an initial trajectory to a trajectory for avoiding a collision.

The vehicle supervisor system 202 may operate according to the following example. Data representing a trajectory of the vehicle in the environment 100 may be received by the vehicle controller 228. Object data associated with an object in the environment 100 surrounding the vehicle 102 may be calculated. Sensor data 206 from one or more of the sensors 204 may be used to calculate the object data. The object data may include data representing the location of the object in the environment 100, an object track associated with the object, such as whether the object is stationary or moving, and an object classification associated with the object, such as whether the object is another vehicle, a pedestrian, a cyclist, an animal, or a stationary object. In some examples, the object data calculator 216, based on the object data, may be used to determine data representing the object's location in the environment 100, data representing whether the object is moving, and data representing a classification associated with the object.

In some examples, the path calculator 214 may use the object data to determine a predicted path of the object in the environment, for example, based on data representing the location of the object and may process that data to generate data representing a predicted object path 213. Data representing the type of object may be determined based on the data representing whether the object is moving, data representing the object's classification, and/or data representing object's type. A pedestrian not in motion, a vehicle in motion, and traffic sign, a lane marker, or a fire hydrant, none of which is in motion, are examples of object types with an associated motion data.

In some examples, the collision predictor system 220 may be used to predict a collision between the vehicle 102 and an object in the environment 100 based on the object type, whether the object is moving, the trajectory of the vehicle 102, the predicted path of the object obtained from the path calculator 214. For example, a collision may be predicted based in part on the object type due to the object moving, the trajectory of the object being in potential conflict with the trajectory of the vehicle 102, and the object having an object classification that indicates the object is a likely collision threat, for example, based on the object's classification.

In some examples, the safety system actuator 224 may be configured to actuate one or more portions of a safety system of the vehicle 102 when a collision is predicted. For example, the safety system actuator 224 may activate one or more safety systems of the vehicle 102, such as, for example, one or more of the interior safety systems, one or more of the exterior safety systems, and one or more of the components of the drive system 232 (e.g., the steering system, the propulsion system, and/or the braking system) via the vehicle controller 228. In some examples, the vehicle controller 228 may determine that the interior safety system will be activated based on some action of an object in the environment 100, and the vehicle control data 230 may include information configured to cause the vehicle controller 228 to activate one or more functions of the interior safety system, the exterior safety system, and the drive system 232.

As shown in FIG. 2, the example vehicle supervisor system 202 also includes an example augmentation system 234 for supplementing a person's view from the vehicle 102 of the environment 100 through which the vehicle 102 travels. The example augmentation system 234 is configured to display, via a display 236, images representative of the display data 238, which is representative of operation of the vehicle 102 and representative of the objects in the environment 100 through which the vehicle 102 travels. In this example manner, the person in the vehicle 102 may be able to see both the environment 100 outside the vehicle and images representative of signals received from the sensors 204 and systems associated with the vehicle 102. For example, if the vehicle 102 is a partially or fully autonomous vehicle, or if the vehicle 102 includes sensors configured to sense data associated with objects outside the vehicle 102, the person's view may be augmented or supplemented with images representative of the sensed data. This may provide the person with the ability to see both the environment 100 and determine whether the sensors 204 of the vehicle have detected objects and/or whether the vehicle 102 projects maneuvering to stay on the road, avoid objects, and/or adhere to vehicle operation laws and regulations.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture 200 is merely illustrative and is not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 200 may be transmitted to the architecture 200 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 102 is discussed below.

Figure 3:
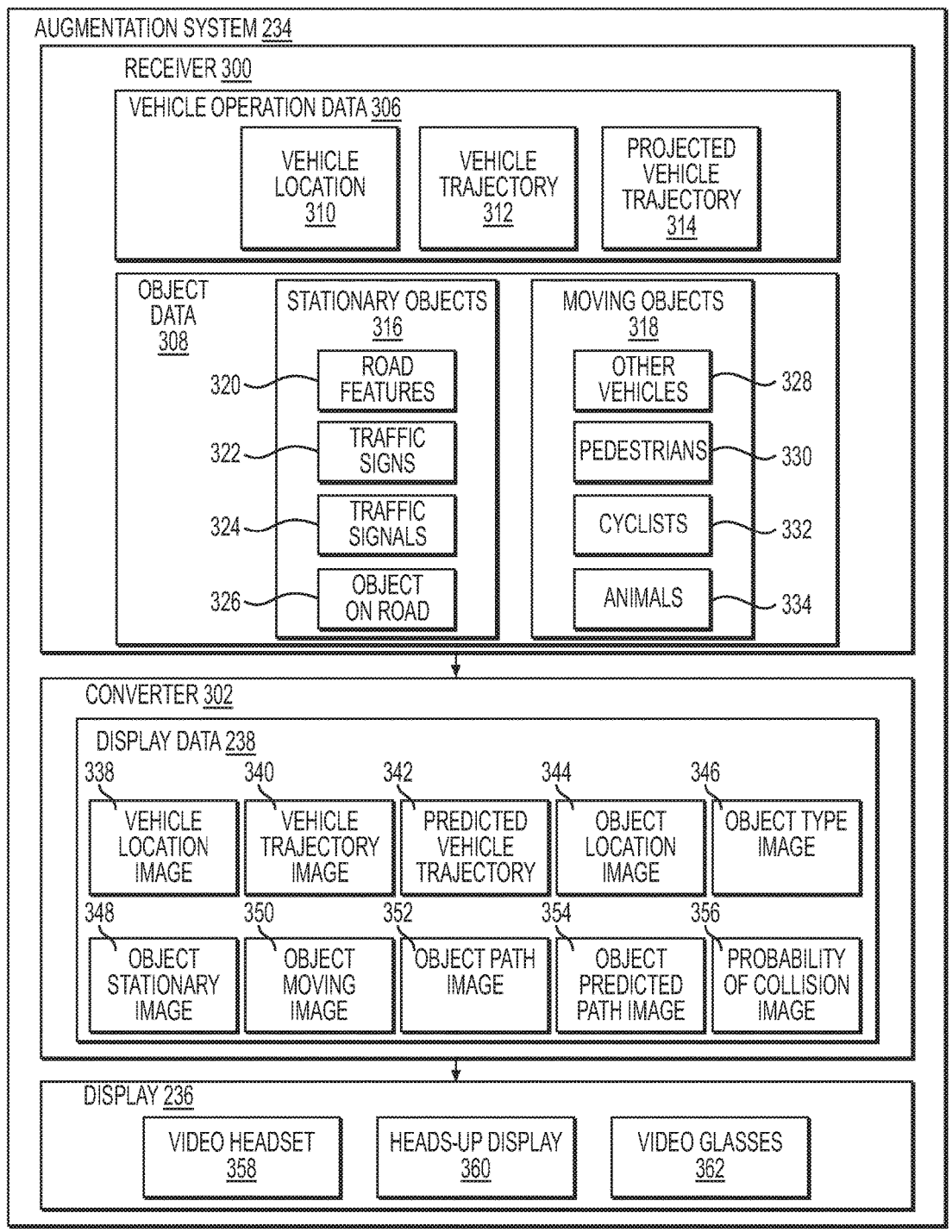
FIG. 3 is a block diagram of an example augmentation system for an example vehicle.

FIG. 3 shows an example augmentation system 234, which includes a receiver 300 configured to receive data signals representative of operation of the vehicle 102 and representative of objects in the environment 100 through which the vehicle 102 travels. The example augmentation system 234 also includes a converter 302 in communication with the receiver 300. The example converter 302 may be configured to convert data signals representative of operation of the vehicle 102 and representative of objects in the environment 100 into display data representative of the operation of the vehicle 102 and representative of the objects in the environment 100 through which the vehicle 102 travels. In some examples, the augmentation system 234 also includes a display 236 in communication with the converter 302 and configured to display, within the person's view from the vehicle 102, images representative of the display data to supplement the person's view. In some examples, the augmentation system 234 may render it possible for the person to view the environment 100 through a windshield or window of the vehicle 102, while simultaneously, within technical tolerances, viewing images representative of the display data to supplement the person's view of the environment 100. In some examples, the person may be an occupant of an actual vehicle, a teleoperator located remotely from a vehicle and communicating with the vehicle via a communication link, or a person operating in a virtual vehicle environment provided by a simulator. In some examples, the vehicle may be an actual vehicle or a virtual vehicle provided by a simulator For example, the data signals representative of operation of the vehicle 102 may include one or more of signals associated with the current trajectory of the vehicle 102 and signals associated with a predicted trajectory of the vehicle 102. This may enable the person to see images including a depiction of the trajectory of the vehicle 102 that corresponds to the trajectory of the vehicle 102 determined by the path calculator 214 using data representative of the location of the vehicle in the environment 100 and other data, such as the local pose data that may be included in the location data 212 from the location systems 210. For example, the location data 212 may include the local pose data from the sensors 204 and/or external sources, such as satellites for facilitating operation of a global positioning system (GPS) and/or a wireless network for communicating and receiving information related to the location of the vehicle 102, such as map data, sensors configured to assist with navigation of the vehicle 102, such as wheel encoders for sensing the rotation of the wheels 134, inertial navigation sensors, and/or cameras for obtaining image data for dead-reckoning navigation. In some examples, the signals associated with a predicted trajectory of the vehicle 102 may be determined by the path calculator 214 using the data representative of the location of the vehicle in the environment 100 and other data, such as the local pose data.

In some examples, the data signals representative of the objects in the environment 100 through which the vehicle 102 travels may include data associated with one or more of the location of the objects, the types of the objects, and the predicted paths of the objects. For example, the augmentation system 234 may receive data from one or more of the object data calculator 216 and the object classifier 218, which are indicative of signals received from the sensors 204 indicating identification of an object in the environment 100 surrounding the vehicle 102, the object's movement or lack of movement, and/or the type of object. In some examples, one or more of the sensors 204 may sense the object, and the object data calculator 216 and/or the object classifier 218 may identify the object type and whether the object is moving. In some examples, if the object is moving, the path calculator 214 may determine a projected path of the object.

As shown in FIG. 3, the example receiver 300 of the augmentation system 234 is configured to receive vehicle operation data 306 related to the operation of the vehicle 102 and/or object data 308 related to objects in the environment 100. For example, the operation data 306 may include data associated with the vehicle location 310 (e.g., location data 212), data associated with the vehicle trajectory 312, and data associated with a projected vehicle trajectory 314. The example object data 308 may include one or more of data associated with stationary objects 316 and data associated with moving objects 318. For example, the data associated with stationary objects 316 may include one or more of data associated with road features 320, data associated with traffic signs 322, data associated with traffic signals 324, and data associated with objects 326 on the road. The data associated with moving objects 318 may include one or more of data associated with other vehicles 328, such as cars, trucks, and motorcycles, data associated with pedestrians 330, data associated with cyclists 332, and data associated with animals 334. Other types of data are contemplated. The data received by the receiver 300 may be provided, for example, as described above, by one or more of the sensors 204, the location systems 202, the path calculator 214, the object data calculator 216, the object classifier 218, the collision predictor system 220, the kinematics calculator 222, and the safety system actuator 224. It is contemplated that the data may be provided by other sources, for example, via a network in communication with the vehicle 102. For example, the environment 100 surrounding the vehicle 102 may include systems having sensors for detecting and/or tracking objects and communicating data related to the detected objects via a network in communication with the vehicle 102, based on which the vehicle 102 may modify its operation. For example, an intersection may be provided with a sensor system for detecting objects and/or predicting object trajectories, and data associated with the object detections and/or predictions may be communicated to the vehicle 102 via a wireless communication network.

In the example shown, the converter 302 may receive the data from the receiver 300 and convert the received data into display data 238 representative of the operation of the vehicle 102 and representative of the objects in the environment 100 through which the vehicle 102 travels. For example, the converter 302 may receive the data and convert it into display data 238 including one or more of data for displaying a vehicle location image 338, data for displaying a vehicle trajectory image 340, data for displaying a predicted vehicle trajectory image 342, data for displaying an object location image 344, data for displaying an object type image 346, data for displaying an object stationary image 348 (e.g., an image indicating that an object is stationary), data for displaying an object moving image 350 (e.g., an image indicating that an object is moving), data for displaying an object path image 352, data for displaying an object historical path, data for displaying an object predicted path image 354 (e.g., an image indicating the predicted path of an object), and a probability of collision image 356 (e.g., an image depicting the probability of the vehicle 102 colliding with an object). Other types of display data 238 are contemplated.

As shown in FIG. 3, the example augmentation system 234 also includes the display 236. The display 236 is in communication with the converter 302 and is configured to display, within the person's view from the vehicle 102, images representative of the display data 238 to supplement the person's view, for example, of the road or other surface on which the vehicle 102 is traveling. For example, the person's view may include the person's view of the vehicle's surrounding environment 100 through a windshield or window. The person's view may in some examples include a virtual view through the windshield or window of the vehicle 102 of the vehicle's surrounding environment 100. For example, the virtual view may be a video depiction of what the person's view would be through the windshield or window of the vehicle 102. In some examples, the display 236 may be configured to display a virtual overlay of the display data, so that the images are superimposed or viewable simultaneously, within technical tolerances, with the person's view of the environment 100.

In the example shown in FIG. 3, the display 236 may include one or more of a video headset 358, a heads-up display 360, and video glasses 362. For example, the video headset 358 may be any headset configured to be worn by the person that displays video information, such as, for example, a video headset configured to show video images simulating objects in three dimensions, a video headset configured to show video images simulating objects in two dimensions, an augmented reality headset, or any other suitable video headsets. In some examples, the person may not be located in a physical vehicle, but may instead be a teleoperator or tester occupying a virtual vehicle that provides a virtual simulation of being inside a vehicle and testing the virtual vehicle. Suitable heads-up displays may include video images depicted on the inside of the windshield or window of the vehicle, for example, by projecting the video image onto a coating on the windshield or window (e.g., inside or outside the vehicle 102) configured to reflect the video images in a manner viewable by the person. In some examples, the heads-up display 360 may include a transparent or substantially transparent sheet of material between the person and the windshield or window, and having a coating on a least a portion thereof configured to reflect the video images projected thereon in a manner viewable by the person. In some examples, the heads-up display 360 may include video panels, such as, for example, LED or OLED panels, and/or panels on which images are projected. Such panels may be associated with or coupled to an interior portion of the vehicle, such as interior panels. For example, a Level 5 fully autonomous vehicle, being able to maneuver without human assistance, may not have a windshield or windows, and thus, the heads-up display 360 may include video panels or panels on which images are projected. In some examples, the video glasses 362 may include glasses at least similar to GOOGLE GLASS® or MICROSOFT HOLOLENS®, which may have the capability to depict video images in the person's view. Different types of displays 236 are contemplated.

Figure 4:
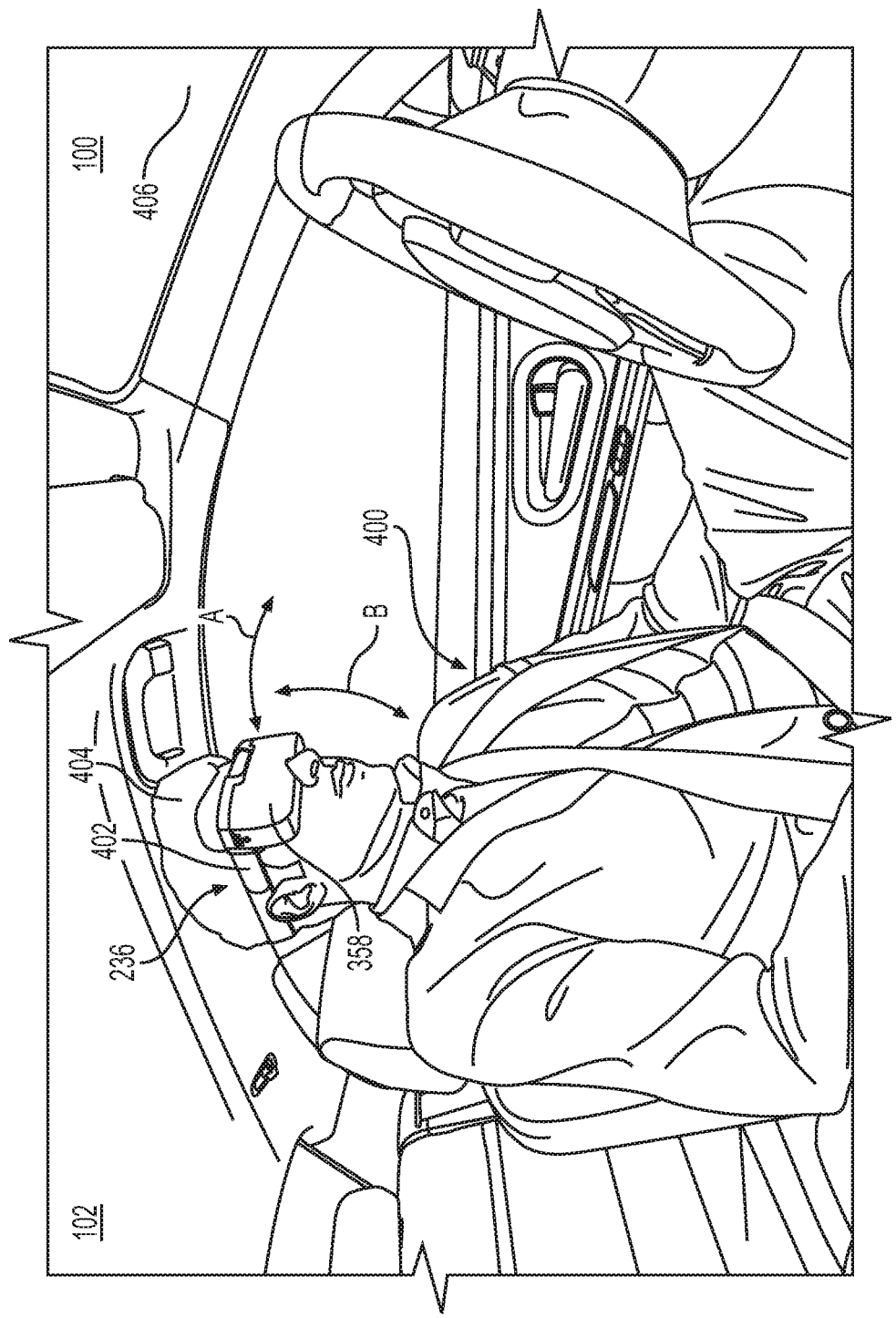
FIG. 4 is a schematic perspective view of an example interior of an example vehicle.

FIG. 4 is schematic perspective view of a person 400 of an example vehicle 102 wearing an example display 236 while seated in a position from which the person 400 may view the environment 100 through the windshield or window 406 of the vehicle 102. The example display 236 shown in FIG. 4 includes a video headset 358 in communication with the converter 302 and configured to display, within the person's view from the vehicle 102, images representative of the display data 238 to supplement the person's view, for example, of the road 104 or other surface on which the vehicle 102 is traveling. In the example depicted, the person 400 may simultaneously, within technical tolerances, view images representative of the operation of the vehicle 102 and representative of the objects in the environment 100 through which the vehicle travels 102.

In some examples, such as the example depicted in FIG. 4, the augmentation system 234 further includes a viewer position and/or orientation system 402 configured to estimate the position of the person's head 404 and/or the display 236, and/or a direction of view of the person 400, for example, relative to a longitudinal axis of the vehicle 102. For example, the viewer position and/or orientation system 402 may be integrated into the display 236, and may be configured to estimate the position of the person's head 404 and/or the display 236, the direction of the view angle relative to the left and right (see arrow A), and/or an elevation angle relative to up and down (see arrow B) in which the person 400 is viewing the environment 100 from the vehicle 102. For example, the display 236 may include one or more accelerometers and/or gyroscopes, and a processor configured to estimate the position and/or orientation of the display 236. In some examples, the display 236 may include a camera, and the viewer position and/or orientation system 402 may include a processor configured to estimate the position and/or direction of view of the person 400 based on image data obtained from the camera. In some examples, the interior of the vehicle 102 may include a camera configured to capture image data associated with a view of the person's head 404, and a processor configured to estimate the position and/or direction of view of the person 400 based on the captured image data. In some examples, the position and/or orientation system 402 may estimate the position of the person's head 404 and/or the display 236, and/or direction of view of the person 400 using systems such as, for example, timed infrared emitters positioned around the person 400 and configured to detect the position of the person's head 404 and/or the display 236, and/or the direction of view of the person 400.

In examples including a viewer position and/or orientation system 402, the viewer position and/or orientation system 402 may be configured to filter the display data 238 to limit the display data 238 to data the is relevant to the person 400's current position and/or direction of view. For example, based on the position of the person 400, if the view of the person 400 is directed to the right-hand portion of a windshield 406, the display data 238 may be limited to displaying objects that would be viewable out the right-hand side of windshield 406 from the person's position. For example, if there is an object, such as a parked vehicle ahead of, and to the left of, the vehicle 102 and left of the direction of travel of the vehicle 102, the viewer position and/or orientation system 402 may prevent the augmentation system 234 from depicting the parked vehicle in the display 236. This example function may reduce the amount of information provided to the person 400 via the display 236 to information that is more relevant, for example, to enable the person 400 to focus on objects that are more important to operation and maneuvering of the vehicle 102 at a given moment. In some examples, the level of filtering may be adjusted, for example, to allow more or less information to be displayed via the display 236.

In some examples, the viewer position and/or orientation system 402 may be configured to substantially maintain alignment between the person's view of the environment 100 and the images representative of the display data 238 that supplements the person's view. For example, as the person's head 404 moves and re-orients relative to the vehicle 102 and/or the environment 100, the person's view changes. In some examples, the viewer position and/or orientation system 402 may be configured to estimate the person's view and/or changes to the person's view, and change the content and/or reposition the content of the images representative of the display data 238 that supplements the person's view. For example, a processor may receive the estimated person's view and/or changes to the person's view, and determine the location in the person's view for displaying the images representative of the display data 238 via the display 236.

Figure 5B:
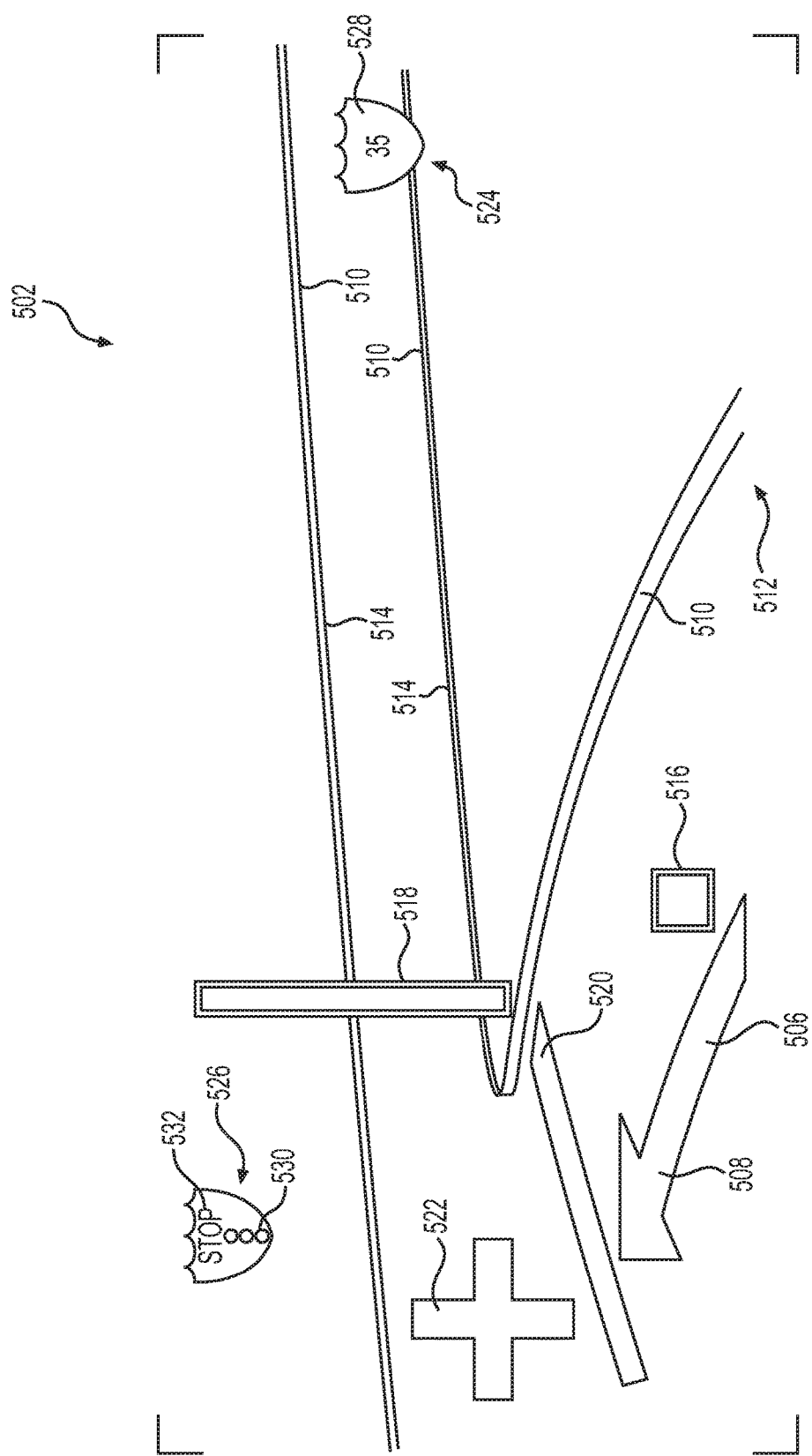
FIG. 5B is an example supplementation of the example view shown in FIG. 5A.
Figure 5C:
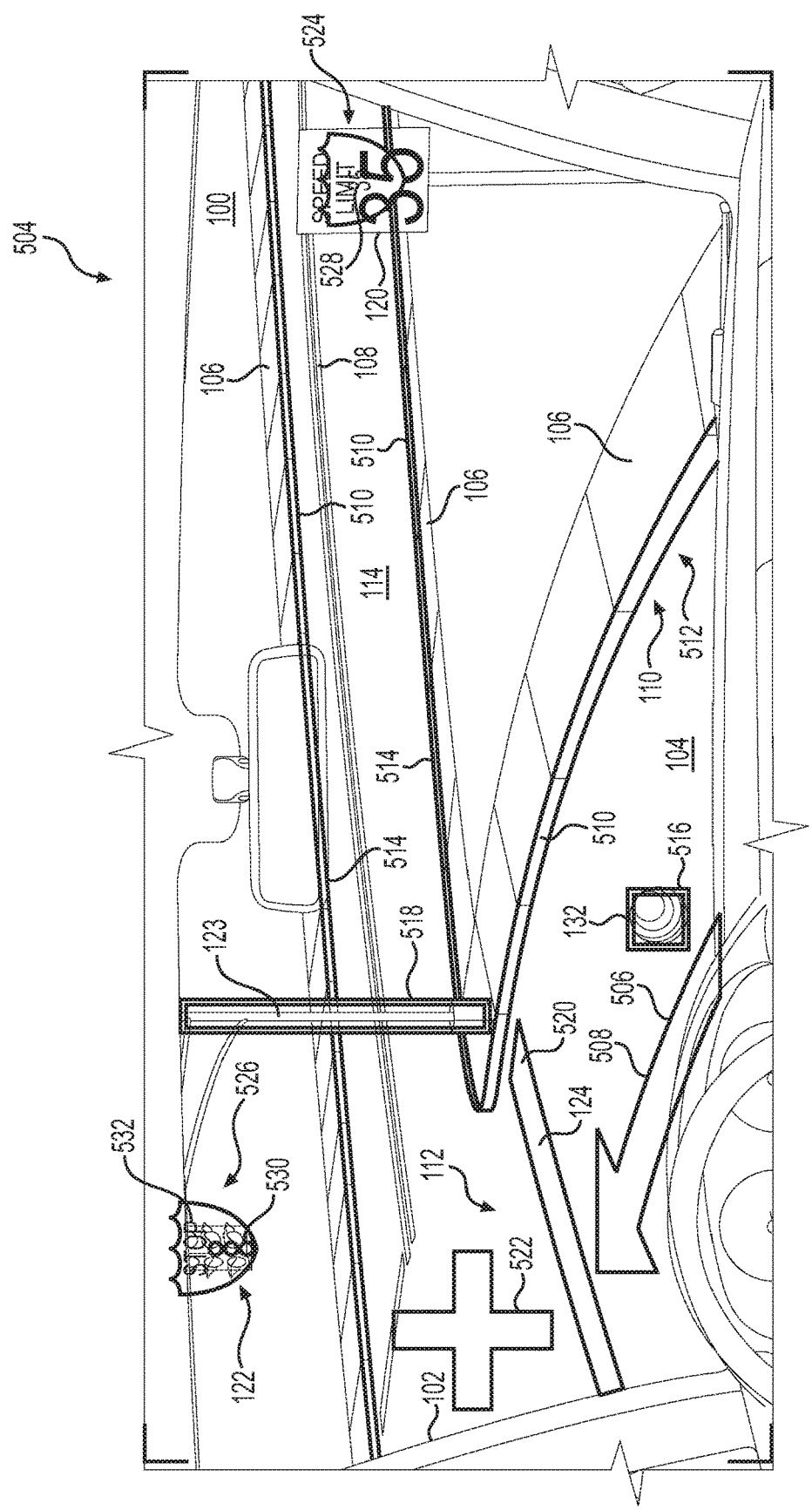
FIG. 5C is an example supplemented view of the example view shown in FIG. 5A.
Figure 6A:
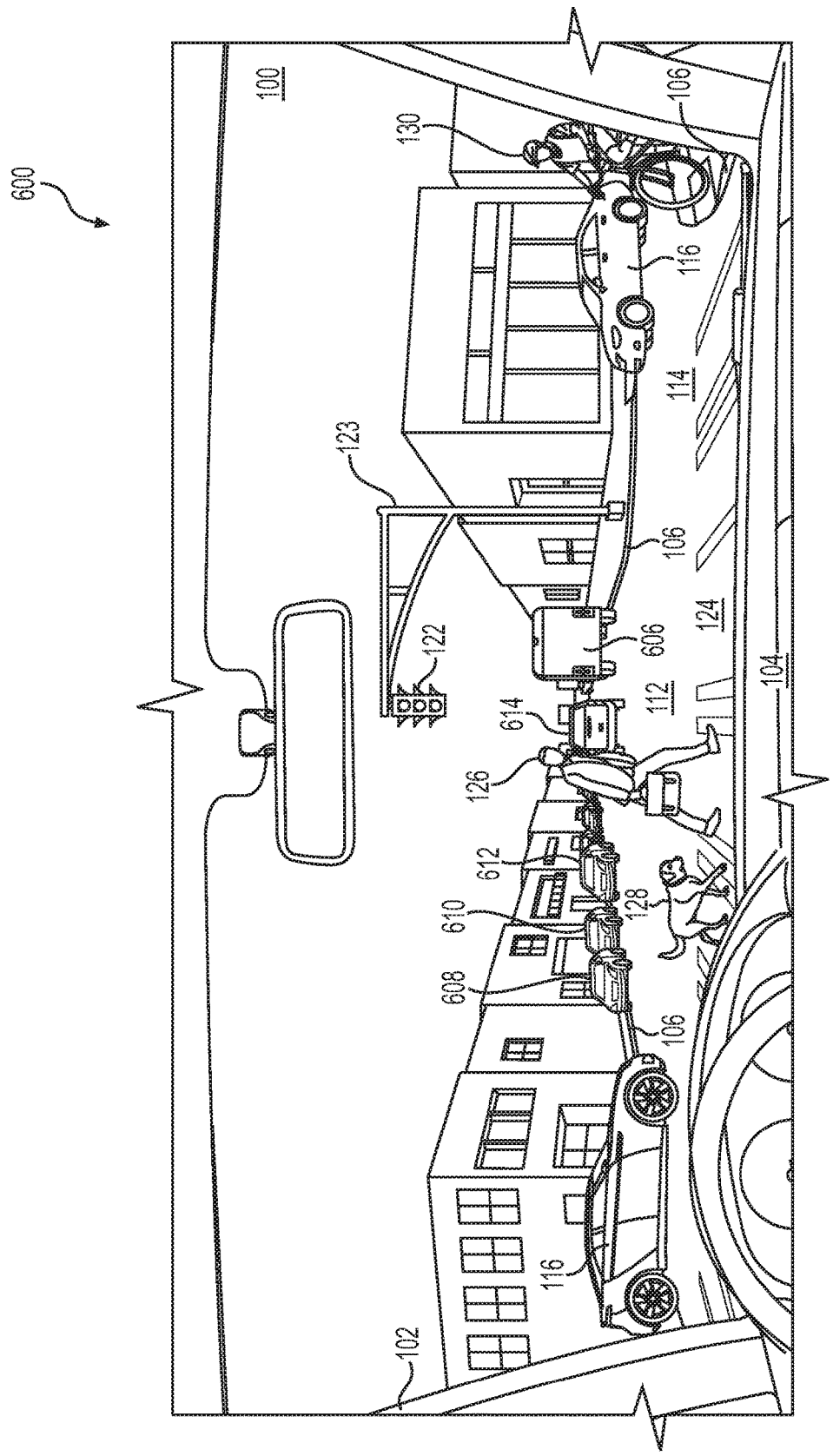
FIG. 6A is a schematic perspective view of another example view from an example vehicle of another example environment through which the vehicle travels.
Figure 6B:
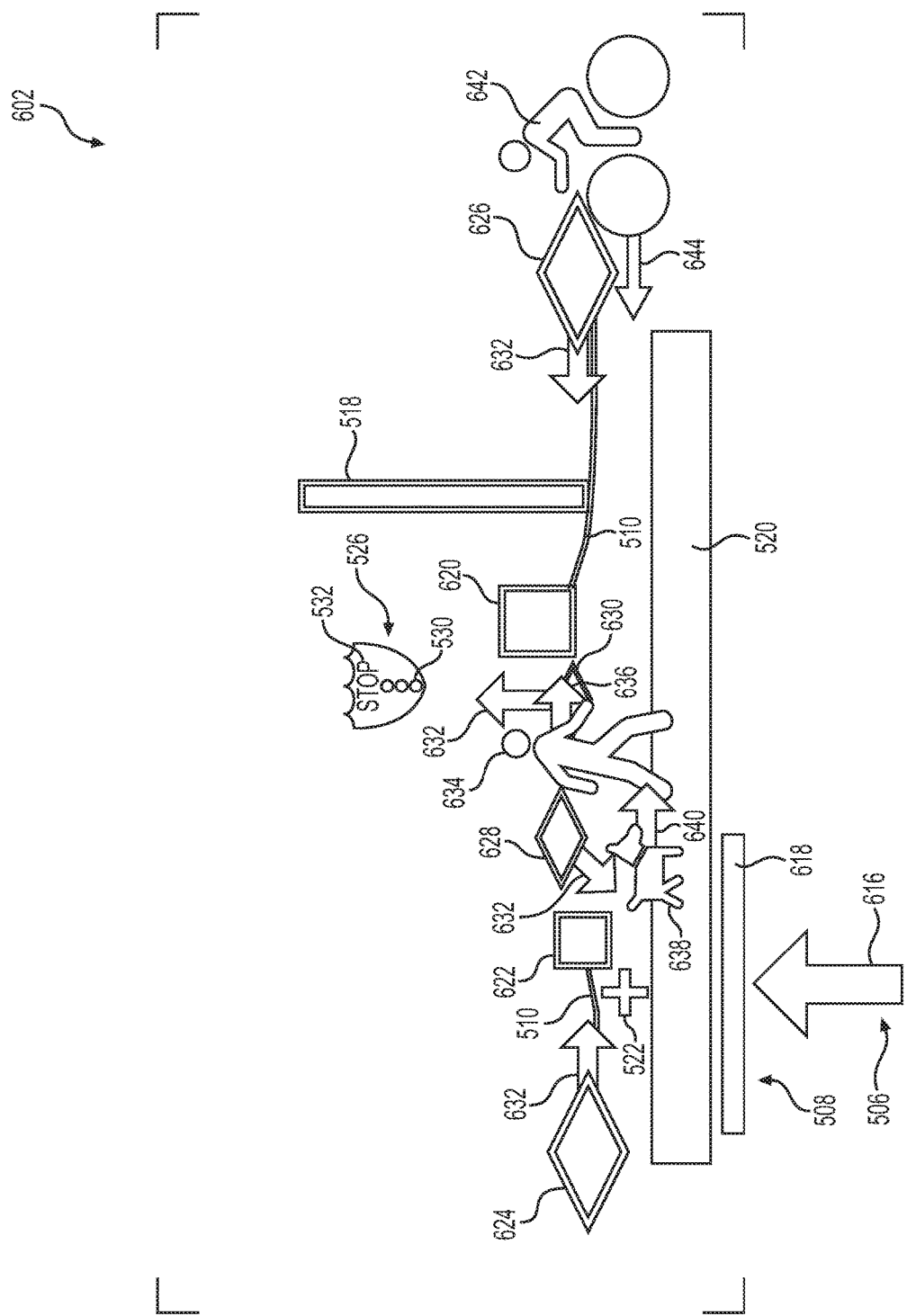
FIG. 6B is an example supplementation of the example view shown in FIG. 6A.

FIGS. 5A and 6A are schematic depictions of example person's views 500 and 600, respectively, from an example vehicle 102 through the windshield 406 of the vehicle 102. FIGS. 5B and 6B are schematic depictions of example supplementations 502 and 602, including example images representative of the display data 238 that supplement the person's views 500 and 600, respectively. FIGS. 5C and 6C are schematic depictions of the person's views 500 and 600, as supplemented by the example supplementations 502 and 602. FIGS. 5C and 6C are depictions of the example supplemented views 504 and 604 the person 400 would see when looking through the windshield 406 (or a virtual depiction of the view through the windshield) at the example environments 100, as supplemented by the augmentation system 234. In some examples, the vehicle 102 may not have a windshield and/or windows. For example, a Level 5 fully autonomous vehicle, being able to maneuver without human assistance, may not have a windshield or windows. In such examples, the display 236 may depict a virtual or simulated view from a windshield or window.

As shown in FIG. 5A, the example person's view 500 is from the perspective of an example vehicle 102 maneuvering on a road 104 through a curve 110 and approaching an intersection 112 at a crossroad 114. A ball 132 (e.g., a stationary object) is present between the vehicle 102 and the intersection 112, and the vehicle 102 is passing a traffic sign 120 (e.g., a speed limit sign indicating a speed limit of 35 mph). The intersection 112 includes a crosswalk 124 crossing the road 104 on which the vehicle 102 is traveling. The intersection 112 also includes a traffic signal 122 mounted on a post 123. The curve 110 is defined on the right-side by the edge 106 of the road 104. The crossroad 114 includes another crosswalk 124, two opposing edges 106, and a center line 108 between the edges 106.

FIG. 5B depicts the supplementation 502 of the person's view 500 and includes example images representative of the display data 238 that supplement the person's view 500. The example supplementation 502 includes images corresponding to the display data 238 representative of operation of the vehicle 102 and representative of objects in the environment 100 through which the vehicle 102 travels. In some examples, the data signals representative of operation of the vehicle 102 and representative of objects in the environment 100 through which the vehicle 102 travels are converted into the display data 238 representative of the operation of the vehicle 102 and representative of the objects in the environment 100 through which the vehicle 102 travels, for example, via the converter 302. The display 236, in communication with the converter 302, displays, within the person's view 500 from the vehicle 102, the images representative of the display data 238 to supplement the person's view 500.

In some examples, the data signals representative of operation of the vehicle 102 include at least one of signals associated with the trajectory of the vehicle 102 and signals associated with the predicted trajectory of the vehicle 102, and the display 236 is configured to display images representative of at least one of the trajectory of the vehicle 102 and the predicted trajectory of the vehicle 102, for example, in the person's view 500.

As shown in FIG. 5B, the example supplementation 502 depicts display of images representative of operation of the vehicle 102, which includes a trajectory image 506 representative of the trajectory of the vehicle 102 and predicted trajectory image 508 representative of the predicted trajectory of the vehicle 102. In FIG. 5B, the example supplementation 502 also includes an example road image 510 representative of the road 104, including an example curve image 512 and an example crossroad image 514 corresponding respectively to the curve 110 and the crossroad 114 shown in the person's view 500 of FIG. 5A.

As shown in FIG. 5C, the example supplementation 502 is displayed in the person's view 500 to form the example supplemented view 504. As shown in FIG. 5C, the supplemented view 504 enables the person 400 to see the actual environment 100, for example, through the windshield 406 or virtually as a part of the displayed images, and images representative of the of operation of the vehicle 102 and the environment 100 through which the vehicle 102 travels. Thus, the person 400 is able to simultaneously see, within technical tolerances, both the actual environment 100 and the environment 100 as it is sensed by the sensors 204 and systems of the vehicle 102. This may enable the person 400 to determine whether the vehicle 102 is aware of various items and objects in the environment 100.

In some examples, the data signals representative of the objects in the environment 100 through which the vehicle 102 travels may include data associated with at least one of the location of the objects, the types of the objects, and the predicted paths of the objects. Based at least in part on the data, the display 236 may be configured to display images representative of at least one of the location of the objects, the types of the objects, and the predicted paths of the objects.

For example, as shown in FIG. 5B, the example supplementation 502 includes an object image 516 representative of the ball 132 in the person's view 500 and an object image 518 representative of the post 123 on which the traffic signal 122 is mounted. The object images 516 and 518 show the location of the object images 516 and 518 relative to the environment 100. The example object images 516 and 518 also provide an indication of the types of objects, such as, for example, whether the objects are stationary objects or moving objects. In the example shown, the object images 516 and 518 are in the form of a rectangle, which is an example indication that the objects are stationary. Because the objects depicted by the object images 516 and 518 are stationary, there is no depiction of a predicted path of these objects. Other image characteristics, such as, for example, size, shape, and/or color, may be used to represent that the object associated with the object image is a stationary object.

In the example shown in FIGS. 5A and 5B, if the ball 132 were rolling or bouncing across the road 104, the object image 516 representative of the ball 132 may provide an image characteristic indicating that the ball 132 is moving and may provide an image characteristic indicating the path and/or predicted path of the ball 132. For example, the object image 516 may have a different size and/or shape, a different color or shade of color, and/or the image may be blinking. In some examples, the object image 516 may include an arrow depicting the trajectory of motion of the ball 132 and/or the predicted trajectory of motion of the ball 132.

As shown in FIG. 5C, the supplemented view 504 enables the person 400 to see the actual environment 100 and object images 516 and 518. Thus, the person 400 is able to simultaneously see, within technical tolerances, the ball 132 and the post 123 of the actual environment 100 and the environment 100 as it is sensed by the sensors 204 and systems of the vehicle 102 in the form of object images 516 and 518. This may enable the person 400 to determine whether the vehicle 102 is aware of objects such as the ball 132 and the post 123.

In some examples, the images may provide an indication of a vehicle operation law or regulation related to the environment 100. For example, the indication of a vehicle operation law or regulation may include one or more of a requirement to stop the vehicle 102 (e.g., a stop sign or traffic light), a requirement to alter the speed of the vehicle 102 (e.g., a speed limit sign), or a requirement to yield right-of-way to at least one of a pedestrian, a cyclist, or another vehicle (e.g., a crosswalk, a yield sign, or an intersection with two or more stop signs).

For example, as shown in FIG. 5B, the example supplementation 502 includes a crosswalk image 520 representing the crosswalk 124, an intersection image 522 representing the intersection 112, a traffic sign image 524 representing the traffic sign 120, and a traffic signal image 526 representing the traffic signal 122. The example crosswalk image 520 includes a box corresponding to the location of the crosswalk 124 in the environment 100. In some examples, the crosswalk image 520 may have a characteristic unique to crosswalk images, such as, for example, a shape and/or size, a color or shade of color, and/or the image may be blinking. In some examples, the crosswalk image 520 may change one or more characteristics depending on, for example, whether a pedestrian 126 or cyclist 130 is crossing the road 104 at the crosswalk 124.

The example intersection image 522 includes a cross corresponding to the location of the intersection 112 in the environment 100. In some examples, the intersection image 522 may have a characteristic unique to intersection images, such as, for example, a shape and/or size, a color or shade of color, and/or the image may be blinking. In some examples, the intersection image 522 may change one or more characteristics depending on, for example, whether the vehicle 102 has the right-of way through the intersection 112. For example, the color of the intersection image 522 may change from green to red when the vehicle 102 does not have the right-of-way through the intersection 112.

The example traffic sign image 524 includes a shield-shaped background to indicate that the image is associated with a vehicle operation law or regulation, and is positioned to indicate the location of the traffic sign 120 in the environment 100. In some examples, the traffic sign image 524 may include sign information 528 related to the law or regulation, such as, for example, the speed limit, as shown in FIG. 5B. The traffic sign image 524 may have a characteristic unique to traffic signs, such as, for example, a shape and/or size, a color or shade of color, and/or the image may be blinking. In some examples, the traffic sign image 524 may change one or more characteristics depending on, for example, whether a change in operation of the vehicle 102 should be made in order to comply to the information associated with the traffic sign 120. For example, the color of the traffic sign image 524 may change according to the information.

The example traffic signal image 526 includes a shield-shaped background to indicate that the image is associated with a vehicle operation law or regulation, and is positioned to indicate the location of the traffic signal 122 in the environment 100. In the example shown, the traffic signal image 526 also includes a signal symbol 530 indicating that the traffic signal image 526 corresponds to a traffic light. In some examples, the traffic signal image 526 may include signal information 532 related to whether the traffic light is green, yellow, or red. In the example shown, the signal information 532 is in the form of the word "STOP." In some examples, the traffic signal symbol may change color to correspond to the color of the traffic light with which the traffic signal image 526 is associated. The traffic signal image 526 may have a characteristic unique to traffic signals, such as, for example, a shape and/or size, a color or shade of color, and/or the image may be blinking. In some examples, the traffic signal image 526 may change one or more characteristics depending on, for example, whether a change in operation of the vehicle 102 should be made in order to comply to the information associated with the traffic signal 122.

As shown in FIG. 5C, the supplemented person's view 504 enables the person 400 to see the actual environment 100 and the images that provide an indication of a vehicle operation law or regulation related to the environment 100. Thus, the person 400 is able to simultaneously see, within technical tolerances, the crosswalk 124, the intersection 112, the traffic sign 120, and the traffic signal 122, and the crosswalk image 520, the intersection image 522, the traffic sign image 524, and the traffic signal image 526, as they are sensed by the sensors 204 and systems of the vehicle 102. This may enable the person 400 to determine whether the vehicle 102 is aware of the need to comply with the vehicle operation laws and regulations present in the environment 100.

In some examples, the images of the supplementation may include images representative of moving objects and may provide an indication that the moving objects are moving. For example, the moving objects may include one or more of another vehicle 116, a pedestrian 126, a cyclist 130, or an animal (e.g., a dog 128). In some examples, the images may provide an indication of one or more of the location of the object, the type of the object, a historical path of the object, and/or a predicted path of the object.

For example, as shown in FIG. 6A, the example person's view 600 is from the perspective of an example vehicle 102 maneuvering on a road 104 and approaching an intersection 112 at a crossroad 114. The intersection 112 includes a crosswalk 124 crossing the road 104 on which the vehicle 102 is traveling. The road 104 on which the vehicle 102 is traveling includes two edges 106 on the opposite side of the intersection 112. The intersection 112 also includes a traffic signal 122 mounted on a post 123. Other vehicles 116 are passing through the intersection 112 on the crossroad 114 in opposite directions. The person's view 600 also includes a stationary truck 606 and two stationary vehicles 608 and 610, as well as two vehicles 612 and 614 traveling on the road 104. In the example person's view 600, the traffic signal 122 is red, and thus, the vehicle 102 must stop at the intersection 112 in order to comply with the associated vehicle operation law. In addition, the person's view 600 shown in FIG. 6A includes a dog 128 crossing the road 104 with a pedestrian 126 at the crosswalk 124, and a cyclist 130 present at the crosswalk 124 adjacent the right edge 106 of the road 104 on which the vehicle 102 is traveling.

FIG. 6B depicts the supplementation 602 of the person's view 600 shown in FIG. 6A and includes example images representative of the display data 238 that supplement the person's view 600. The example supplementation 602 includes images corresponding to the display data 238 representative of operation of the vehicle 102 and representative of objects in the environment 100 through which the vehicle 102 travels.

The example supplementation 602 includes a trajectory image 506 and a predicted trajectory image 508 for the vehicle 102, as well as road images 510 depicting the edges 106 of the road 104 on which the vehicle 102 is traveling. The example arrow 616 representing the trajectory image 506 indicates the vehicle 102's current direction of travel, and the example bar 618 represents the predicted trajectory image 508 and indicates that the vehicle 102 intends to stop at the intersection 112 at a point prior to entry into the intersection 112 and before crossing into the crosswalk 124.

The supplementation 602 also includes an object image 518 representative of the post 123 on which the traffic signal 122 is mounted, and a traffic signal image 526 indicating that the traffic light is red, as depicted by signal symbol 530 and the signal indication 532.

The supplementation 602 also includes an object image 620 representative of the stationary truck 606 and an object image 622 representative of the stationary vehicles 608 and 610. The example object images 620 and 622 are depicted as rectangular and without arrows in order to represent that the truck 606 and vehicles 608 and 610 are stationary. Other representations are contemplated.

The example supplementation 602 also includes object images 624, 626, 628, and 630 representative of the moving vehicles 116 (2), 612, and 614, respectively, shown in FIG. 6A. The example object images 624, 626, 628, and 630 include diamond-shaped boxes showing the current locations of the vehicles 116 (2), 612, and 614 in the environment 100. In addition, the object images 624, 626, 628, and 630 include arrows 632 depicting the current trajectories of the corresponding vehicles. In some examples, the speed of the vehicles may be represented by the length of the tails of the arrows 632, for example, with longer lengths depicting relatively higher speeds. In some examples, the object images may also include depictions representative of the predicted trajectories of the vehicles 116 (2), 612, and 614, for example, obtained from the path calculator 214.

The example supplementation 602 also includes a pedestrian image 634 representative of the pedestrian 126 crossing the road 104 on the crosswalk 124. The example pedestrian image 634 is a depiction of a person walking and includes an arrow 636 to indicate the trajectory of the pedestrian 126. Other depictions of a moving pedestrian are contemplated. In some examples, the pedestrian image 634 may also include an indication of a predicted trajectory, which may be co-extensive with the arrow 636, unless, for example, other objects in the environment 100 are moving such that it is predictable that the pedestrian 126 will change speed and/or direction of trajectory. For example, if another vehicle were to turn toward the pedestrian 126 as the pedestrian 126 traverses the crosswalk 124, the pedestrian 126 might be predicted to take evasive action to avoid being hit by the vehicle. This may be predicted by the path calculator 214, and the augmentation system 234 may use the predicted trajectory of the pedestrian 126 to display an image representative of the predicted trajectory of the pedestrian 126.

The example supplementation 702 also includes a dog image 638 representative of the dog 128 crossing the road 104 along the crosswalk 124. The dog image 638 may include an arrow 640 showing the trajectory of the dog 128. Other depictions of a moving animal are contemplated. In some examples, the dog image 638 may also include an indication of a predicted trajectory, which may be co-extensive with the arrow 640, unless, for example, other objects in the environment 100 are moving such that it is predictable that the dog 128 will change speed and/or direction of trajectory. In some examples, the dog image 638 may include an image representing that the trajectory of the dog 128 may be more unpredictable than, for example, the pedestrian 126. For example, the dog image 638 may be a different color, the dog image 638 may blink, and/or the dog image 638 may include an arrow 640 that oscillates to indicate the relative unpredictability of the trajectory of the dog 128.

As shown in FIG. 6B, the example supplementation 602 also includes a cyclist image 642 representative of the cyclist 130 crossing the road 104, for example, along the crosswalk 124. The example cyclist image 642 is a depiction of a cyclist riding a bicycle and includes an arrow 644 to indicate the trajectory of the cyclist 130. Other depictions of a moving cyclist are contemplated. In some examples, the cyclist image 642 may also include an indication of a predicted trajectory, which may be co-extensive with the arrow 644, unless, for example, other objects in the environment 100 are moving such that it is predictable that the cyclist 130 will change speed and/or direction of trajectory. For example, if another vehicle were to turn toward the cyclist 130 as the cyclist 130 crosses the road 104, the cyclist 130 might be predicted to take evasive action to avoid being hit by the vehicle. This may be predicted by the path calculator 214, and the augmentation system 234 may use the predicted trajectory of the cyclist 130 to display an image representative of the predicted trajectory of the cyclist 130.

The images shown in FIG. 6B may have other characteristics, such as, for example, a different shape and/or size, a different color or shade of color, and/or the images may be blinking. In some examples, the images shown in FIG. 6B may change one or more characteristic depending on, for example, whether a change in status of the object associated with the image occurs, for example, if a stationary object begins to move, if a moving object stops, or a moving objects changes speed or trajectory.

As shown in FIG. 6C, the supplemented view 604 enables the person 400 to see both the actual environment 100 including the various objects, and the images representative of those objects. Thus, the person 400 is able to simultaneously see, within technical tolerances, the road 104 and its related images 510, the intersection 112 and its related intersection image 522, the crossroad 114 and its related crossroad image 514, the crosswalk 124 and its related crosswalk image 520, and/or the traffic signal 122 and its related traffic signal image 526. In addition, the person 400 is able to simultaneously see the vehicles, both stationary and moving, and their related object images 620, 622, 624, 626, 628, and 630. The person 400 is also able to simultaneously see the pedestrian 126 and the pedestrian image 634 the dog 128 and the dog image 638, and/or the cyclist 130 and the cyclist image 642. This may enable the person 400 to determine whether the vehicle 102 is aware of the environment and the objects in it.

In some examples, one or more of the images may include an image providing an indication of a predicted collision with one or more of the objects. For example, the collision predictor system 220 may determine the probability of a collision between the vehicle 102 and one or more of the objects. The converter 302 may receive data from the collision predictor system 220 and convert the data to probability of collision image data 356, which is displayed via the display 236. In some examples, the indication of a predicted collision may include, but is not limited to, one or more of an addition of a textural overlay, a change of color of the image associated with the object, a change in shape of the image associated with the object, a change of shade of color of the image associated with the object, a change in size of the image associated with the object, blinking of the image associated with the object, or a change in rate of blinking of the image associated with the object. In some examples, the indication of a predicted collision may change based at least in part on a change in probability of the predicted collision occurring.

Figure 7:
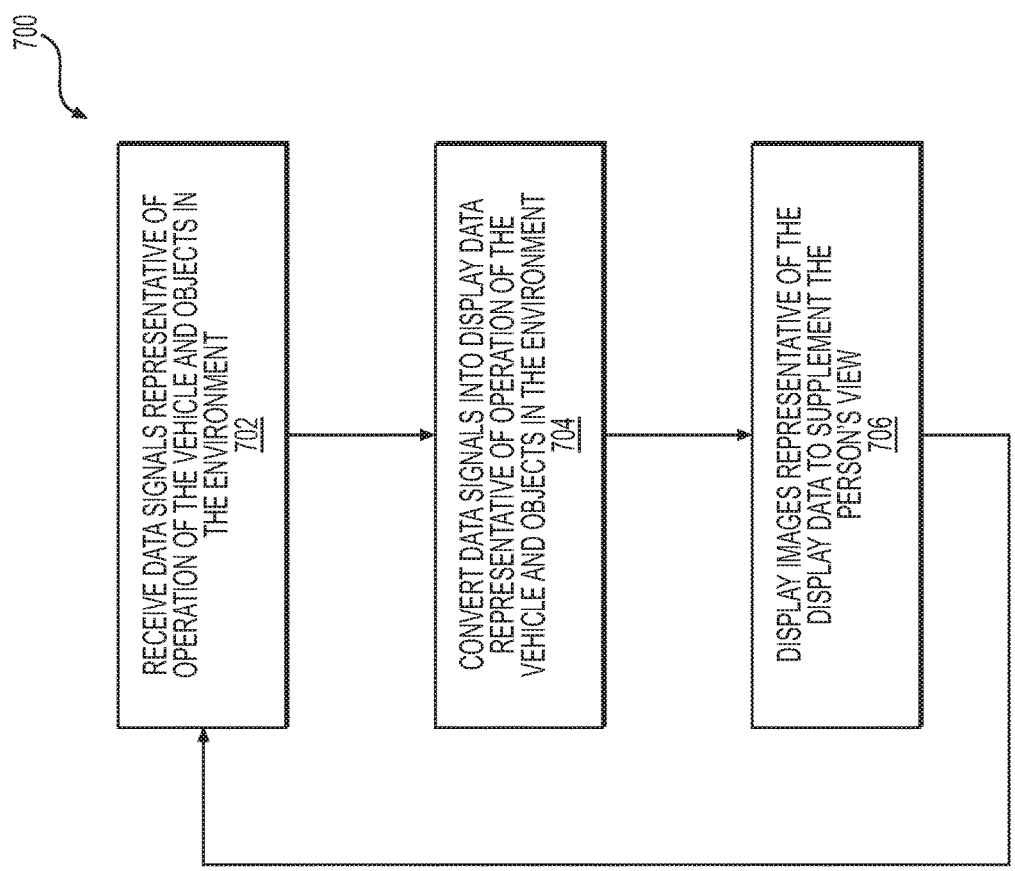
FIG. 7 is a flow diagram of an example method for supplementing a monitor view from a vehicle of an environment through which the vehicle travels.

FIG. 7 is flow diagram of an example method illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 7 depicts a flow diagram of an example method 700 for supplementing a person's view from a vehicle of an environment through which the vehicle travels. At step 802, the example method includes receiving data signals representative of operation of the vehicle 102 and representative of objects in the environment 100 through which the vehicle 102 travels. In some examples, this may include receiving at least one of signals associated with trajectory of the vehicle 102, signals associated with a predicted trajectory of the vehicle 102, or signals associated with objects in the environment 100. In some examples, as shown in FIG. 2, this may include receiving one or more of sensor data 206 from the sensors 204, location data 212 from the location systems 210, data from the path calculator 214, object data from the object data calculator 216, collision predictor data from the collision predictor system 22, kinematics data from the kinematics calculator 222, object classification data from the object classifier 218, and vehicle control data 230 from the vehicle controller 228.

At step 704 of the example method 700, the method 700 may include converting the data signals into display data 238 representative of the operation of the vehicle 102 and representative of the objects in the environment 100 through which the vehicle 102 travels. This may include converting one or more of the vehicle operation data 306 and object data 308 into the display data 238. As shown in FIG. 3, the display data 238 may include data associated with one or more of a vehicle location image 338, a vehicle trajectory image 340, a predicted vehicle trajectory image 342, an object location image 344, an object type image 346, an object stationary image 348, an object moving image 350, an object path image 352, an object historical path image, an object predicted path image 354, and a probability of collision image 356.

At step 706 of the example method 700, the method 700 may include displaying, within the person's view from the vehicle 102, images representative of the display data 238 to supplement the person's view. For example, displaying the images may include displaying the images via a display 236. In some examples, the display 236 may include one or more of a video headset configured to be worn by the person, a heads-up display configured to be associated with a windshield of the vehicle, and video glasses. In some examples, the person may be located remotely from the vehicle in the form of a teleoperator, and/or may be located in a simulated or virtual vehicle.

In some examples of the method 700, the displaying the images may include estimating a position and/or a direction of view of the person (e.g., relative to a longitudinal axis of the vehicle or relative to the road), and displaying the images based in part on the direction of view. This may filter the display data 238 to limit the data to data that is relevant to the person's position and/or current direction of view. For example, for a given person's position, if the view of the person is directed to a particular portion of a windshield (or virtual windshield) of the vehicle 102, the display data 238 may be limited to displaying objects that would be viewable from that portion of the windshield. In some examples, this function may reduce the amount of information provided to the person via the display 236 to information that is more relevant. In some examples, the level of filtering may be adjusted, for example, to allow more or less information to be displayed via the display 236.

In some examples of the method 700, displaying the images includes displaying images that include one or more of an image representative of a stationary object, and displaying an indication that the stationary object is stationary. In some examples, the displayed stationary object may be one or more of an edge of a road on which the vehicle travels, a sign, a traffic signal, and an object on the road. In some examples of the method 700, displaying the images may include displaying one or more of the location and the type of the stationary object.

In some examples of the method 700, displaying the images may include displaying a moving object, and displaying a moving object may include displaying an indication that the moving object is moving. For example, the moving object may be one or more of a vehicle, a pedestrian, a cyclist, and an animal, and the method may include displaying one or more of the location of the moving object, the type of the moving object, and a predicted path of the moving object.

In some examples of the method 700, displaying the images may include displaying an image providing an indication of a predicted collision between the vehicle 102 and at least one of the objects. For example, displaying the indication of the predicted collision may include one or more of adding a textural overlay to the image, changing a color of the image, changing a shade of color of the image, changing a shape of the image, changing the size of the image, causing the image to blink, and causing a change in the rate of blinking of the image. In some examples, displaying the image providing the indication of the predicted collision may include changing the image based at least in part on a change in probability of the predicted collision occurring.

In some examples of the method 700, displaying the images may include displaying an indication of a vehicle operation law or regulation. For example, displaying the indication of the vehicle operation law may include displaying an indication of at least one of a requirement to stop the vehicle, a requirement to alter the speed of the vehicle, or a requirement to yield right-of-way to at least one of a pedestrian, a cyclist, or another vehicle, though other examples are contemplated.

Figure 8:
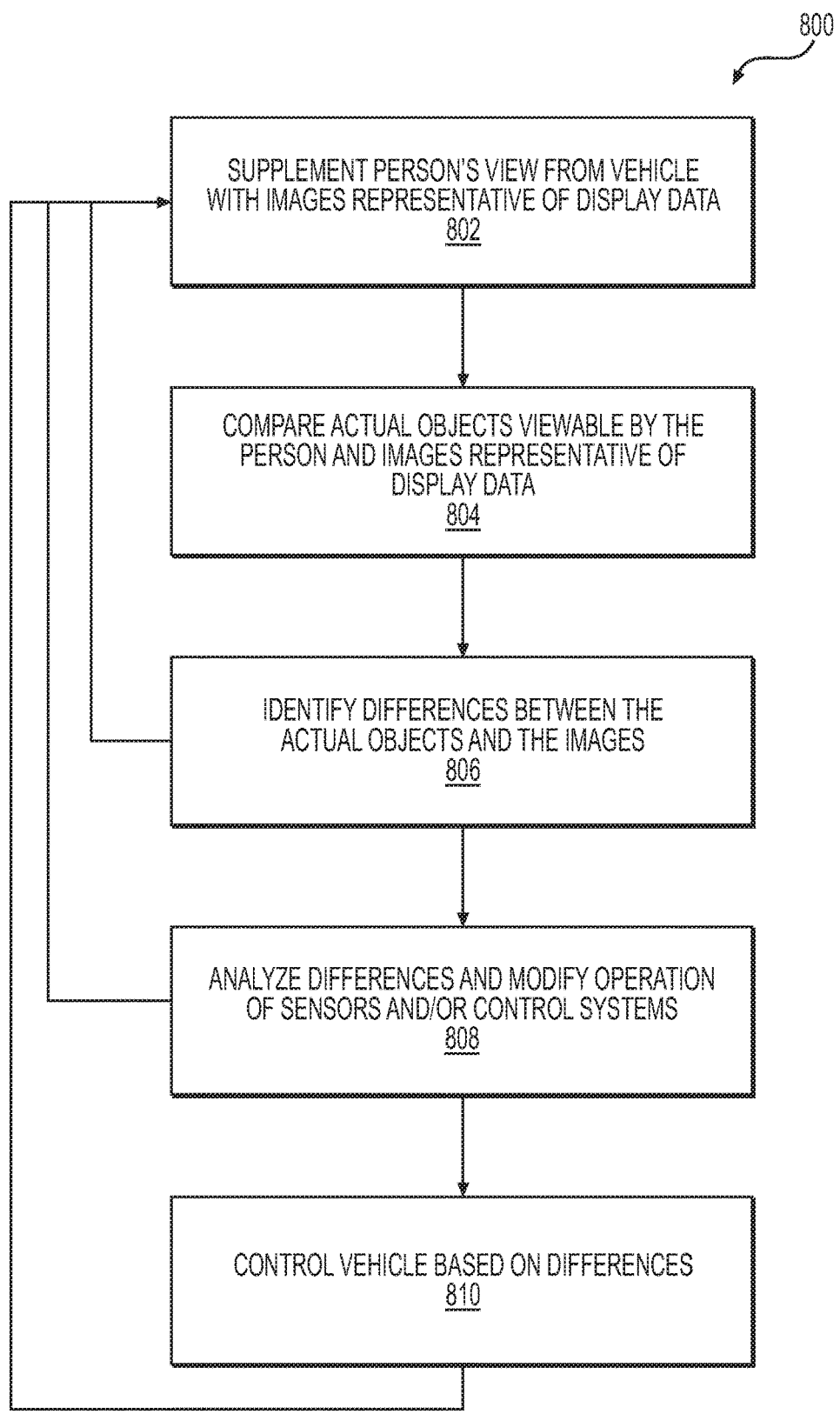
FIG. 8 is a flow diagram of an example method for testing an autonomous vehicle.

FIG. 8 depicts a flow diagram of an example method 800 for testing an autonomous vehicle. At step 802, the example method 800 may include supplementing the person's view from the vehicle of the environment through which the vehicle travels, according to any of the methods set forth herein. At step 804, the method 800 may further include comparing actual objects viewable by the person from the vehicle with the images representative of the display data. At step 806, the method 800 may further include identifying differences between the actual objects in the environment and the images based on the comparison. This may be performed visually by the person or may be performed via image analysis techniques. In some examples, following step 806, the method may return to step 802 and repeat steps 802 through 806. This may occur, for example, if the vehicle is being driven in a manual mode for data collection purposes rather than testing the autonomous capabilities of the vehicle.

In some examples, at step 808, the method 800 may also include analyzing the differences determined in step 806 and modifying operation of the sensors and/or control systems of the vehicle to reduce the number and/or magnitude of the differences. This may include re-calibrating or adjusting operation of the sensors, and/or adjusting operation of the systems that interpret the data signals received from the sensors. In some examples, following step 808, the method may return to step 802 and repeat steps 802 through 808.

In some examples, at step 810, the method 800 may also include controlling the vehicle manually based at least in part on the differences. In some examples, the manual control may be performed by the person, for example, via one or more input devices, such as a steering controller such as a steering wheel or yoke, a propulsion controller such as a pedal or lever, and a braking actuator such as a pedal or lever. In some examples, following step 810, the method may return to step 802 and repeat steps 802 through 810.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for estimating friction-related data and technologies for vehicle control have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. An augmentation system for supplementing a person's view from a vehicle of an environment through which the vehicle travels, the augmentation system comprising:
    a sensor on the vehicle configured to generate sensor data, the sensor data representative of an object in the environment through which the vehicle travels;
    a display; and
    one or more processors configured to:
        determine a direction of view of the person;
        determine, based at least in part on the direction of view, a subset of the sensor data;
        determine, based at least in part on the subset of the sensor data, a representation of the object in the environment through which the vehicle travels; and
        cause the display to augment the person's view of the environment through which the vehicle travels by presenting the subset of the sensor data superimposed with the representation of the object,
    wherein the representation of the object is indicative of at least one of a location of the object, one or more extents of the object, a type of the object, a historical path of the object, or a predicted path of the object.

2. The augmentation system of claim 1, wherein the one or more processors are further configured to:
    determine vehicle data signals representative of operation of the vehicle,
    wherein the vehicle data signals representative of operation of the vehicle comprise at least one of signals associated with a trajectory of the vehicle or signals associated with a predicted trajectory of the vehicle, and wherein the vehicle data signals are further configured to display images representative of at least one of the trajectory of the vehicle or the predicted trajectory of the vehicle.

3. The augmentation system of claim 1, wherein the representation of the object in the environment through which the vehicle travels comprises one or more bounding boxes.

4. The augmentation system of claim 1, wherein the display comprises at least one of a video headset configured to be worn by the person, a heads-up display configured to be associated with the vehicle, or video glasses.

5. The augmentation system of claim 1, further comprising at least one of a viewer position or orientation system configured to estimate at least one of a position of the person or the direction of view of the person, with respect to the vehicle.

6. The augmentation system of claim 1, wherein at least one of the images comprises an image representative of a stationary object and providing an indication that the stationary object is stationary.

7. The augmentation system of claim 6, wherein the stationary object is at least one of an edge of a road on which the vehicle travels, a sign, a traffic signal, or an object on the road, and the image provides an indication of at least one of the location or a type of object.

8. The augmentation system of claim 1, wherein at least one of the images comprises an image representative of a moving object and providing an indication that the moving object is moving.

9. The augmentation system of claim 8, wherein the moving object is at least one of a vehicle, a pedestrian, a cyclist, or an animal, and the image provides an indication of at least one of a location of the object, a type of the object, a historical path of the object, or a predicted path of the object.

10. The augmentation system of claim 1, wherein at least one of the images comprises an image providing an indication of a predicted collision with the object, and wherein the indication of a predicted collision comprises at least one of an addition of a textual overlay to the image, a change of color of the image, a change of shade of color of the image, a change of shape of the image, a change in size of the image, blinking of the image, or a change in rate of blinking of the image.

11. The augmentation system of claim 10, wherein the indication of a predicted collision changes based at least in part on a change in probability of the predicted collision occurring.

12. The augmentation system of claim 1, wherein the display, when augmenting the person's view, is configured to cause the person to control the vehicle based at least in part on the comparison.

13. The augmentation system of claim 1, wherein at least one of the images provides an indication of a vehicle operation law or regulation.

14. The augmentation system of claim 13, wherein the indication of a vehicle operation law or regulation comprises an indication of at least one of a requirement to stop the vehicle, a maximum speed of the vehicle, or a requirement to yield right-of-way to at least one of a pedestrian, a cyclist, or another vehicle.

15. The augmentation system of claim 1, wherein the sensor comprises one or more of a LIDAR sensor, a camera, or RADAR.

16. A method for supplementing a person's view from at least one of an actual vehicle or a virtual vehicle of an environment through which the vehicle travels, the method comprising:
receiving data signals representative of operation of the vehicle and representative of objects in the environment through which the vehicle travels;
converting the data signals into display data representative of the operation of the vehicle and representative of the objects in the environment through which the vehicle travels;
displaying images representative of the operation of the vehicle and images representative of the objects in the environment through which the vehicle travels to a person to supplement the person's view, such that the images representative of the operation of the vehicle and the images representative of the objects in the environment through which the vehicle travels are superimposed onto a representation of the environment to augment the person's view of the environment;
comparing, as a comparison, at least one of objects or vehicle motion displayed in the representation of the environment with the images representative of the operation of the vehicle and the images representative of the objects in the environment through which the vehicle travels;
identifying, based at least in part on the comparison, differences between the objects displayed in the representation of the environment and the images representative of the operation of the vehicle and the images representative of the objects in the environment through which the vehicle travels; and
controlling the vehicle based at least in part on the differences,
wherein the images representative of the objects in the environment through which the vehicle travels comprise data associated with at least one of a location of the objects, types of the objects, historical paths of the objects, or predicted paths of the objects.

17. The method of claim 16, wherein receiving the data signals representative of operation of the vehicle comprises receiving at least one of signals associated with a trajectory of the vehicle or signals associated with a predicted trajectory of the vehicle, and wherein displaying images representative of the operation of the vehicle comprises displaying images representative of at least one of the trajectory of the vehicle or the predicted trajectory of the vehicle.

18. The method of claim 16, wherein displaying the images representative of the operation of the vehicle, the images representative of the objects in the environment through which the vehicle travels, and the representation of the environment occurs substantially simultaneously.

19. The method of claim 16, wherein displaying images representative of the operation of the vehicle and the images representative of the objects in the environment through which the vehicle travels comprises displaying the images via at least one of a video headset configured to be worn by a person, a heads-up display configured to be associated with a windshield of the vehicle, or video glasses.

20. The method of claim 16, further comprising estimating at least one of a position of the person or a direction of view of the person and displaying the images based in part on the at least one of the position or the direction of view.

21. The method of claim 16, wherein at least one of the images comprises an image representative of a stationary object, and the method comprises displaying an indication that the stationary object is stationary.

22. The method of claim 21, wherein the stationary object is at least one of an edge of a road on which the vehicle travels, a sign, a traffic signal, or an object on the road, and the method comprises displaying at least one of the location or the type of the stationary object.

23. The method of claim 16, wherein at least one of the images comprises an image representative of a moving object, and the method comprises displaying an indication that the moving object is moving.

24. The method of claim 23, wherein the moving object is at least one of a vehicle, a pedestrian, a cyclist, or an animal, and the method comprises displaying at least one of a location of the moving object, a type of the moving object, a historical path of the moving object, or a predicted path of the moving object.

25. The method of claim 16, wherein displaying the images comprises displaying an image providing an indication of a predicted collision between the vehicle and at least one of the objects.

26. The method of claim 25, wherein displaying the indication of the predicted collision comprises at least one of adding a textual overlay to the image, changing a color of the image, changing a shade of color of the image, changing a shape of the image, changing a size of the image, causing the image to blink, or causing a change in a rate of blinking of the image.

27. The method of claim 26, wherein displaying the image providing the indication of the predicted collision comprises changing the image based at least in part on a change in probability of the predicted collision occurring.

28. The method of claim 16, wherein displaying the images comprises displaying an indication of a vehicle operation law or regulation.

29. The method of claim 28, wherein displaying the indication of the vehicle operation law or regulation comprises displaying an indication of at least one of a requirement to stop the vehicle, a maximum speed of the vehicle, or a requirement to yield right-of-way to at least one of a pedestrian, a cyclist, or another vehicle.

30. A method for testing an autonomous vehicle, the method comprising:

supplementing a person's view from the autonomous vehicle of an environment through which the autonomous vehicle travels, the autonomous vehicle comprising an actual vehicle, the supplementing comprising:
receiving data signals representative of operation of the autonomous vehicle and representative of objects in the environment through which the autonomous vehicle travels;
converting the data signals into images representative of the operation of the autonomous vehicle and images representative of the objects in the environment through which the autonomous vehicle travels;
superimposing the images representative of the operation of the autonomous vehicle and the images representative of the objects in the environment through which the autonomous vehicle travels with the person's view from the autonomous vehicle;
comparing, as a comparison, actual objects viewable by the person from the autonomous vehicle with the images representative of the operation of the autonomous vehicle and the images representative of the objects in the environment through which the autonomous vehicle travels; and
identifying, based at least in part on the comparison, differences between the actual objects and the images representative of the objects in the environment through which the autonomous vehicle travels.

31. The method of claim 30, further comprising collecting data associated with the differences.

32. The method of claim 30, further comprising analyzing the differences and modifying operation of at least one of sensors associated with the autonomous vehicle or control systems associated with the autonomous vehicle.

33. The method of claim 30, further comprising receiving at least one manual input to control the autonomous vehicle manually based in part on the differences.

* * * * *